(12) United States Patent
Xu et al.

(10) Patent No.: US 11,259,280 B2
(45) Date of Patent: *Feb. 22, 2022

(54) SUB-CHANNEL MAPPING

(71) Applicant: QUALCOMM Incorporated, San Diego, CA (US)

(72) Inventors: Changlong Xu, Beijing (CN); Jian Li, Beijing (CN); Chao Wei, Beijing (CN); Chong Li, Weehawken, NJ (US); Tingfang Ji, San Diego, CA (US); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/336,303

(22) PCT Filed: Jul. 11, 2017

(86) PCT No.: PCT/CN2017/092486
§ 371 (c)(1),
(2) Date: Mar. 25, 2019

(87) PCT Pub. No.: WO2018/059070
PCT Pub. Date: Apr. 5, 2018

(65) Prior Publication Data
US 2020/0187166 A1    Jun. 11, 2020

(30) Foreign Application Priority Data

Sep. 28, 2016   (WO) ................ PCT/CN2016/100511

(51) Int. Cl.
*H04W 72/04* (2009.01)
*H04L 1/00* (2006.01)

(52) U.S. Cl.
CPC ........... *H04W 72/04* (2013.01); *H04L 1/0057* (2013.01)

(58) Field of Classification Search
CPC ........................... H04W 72/04; H04L 1/0057
See application file for complete search history.

(56) References Cited

U.S. PATENT DOCUMENTS

2002/0138807 A1   9/2002 Nguyen
2006/0056534 A1*  3/2006 Ionescu ..................... H04L 1/02
(Continued)

FOREIGN PATENT DOCUMENTS

CN           1507239 A    6/2004
CN         102026377 A    4/2011
(Continued)

OTHER PUBLICATIONS

International Search Report and Written Opinion—PCT/CN2017/092486—ISA/EPO—dated Sep. 27, 2017.
(Continued)

*Primary Examiner* — Ronald B Abelson
(74) *Attorney, Agent, or Firm* — Loza & Loza, LLP

(57) ABSTRACT

Various aspects of the disclosure relate to mapping different information to different sub-channels. For example, information for different users may be mapped to different Polar code sub-channels. In some aspects, the mapping may be unbalanced in that different information is mapped to different sub-channels according to the quality (e.g., in terms of error probability) of the sub-channels and a criterion associated with the information. For example, control information for users that are experiencing the worst channel quality (e.g., in a wireless communication channel) may be mapped to the Polar code sub-channels that have the best quality.

18 Claims, 16 Drawing Sheets

(56) References Cited

U.S. PATENT DOCUMENTS

| | | | |
|---|---|---|---|
| 2011/0026392 A1* | 2/2011 | Wen | H04J 11/00 |
| 2013/0235943 A1 | 9/2013 | Tong | |
| 2015/0331834 A1* | 11/2015 | Sabelkin | G06F 17/14 |
| 2016/0127264 A1* | 5/2016 | Williamson | H04L 12/927 |
| 2016/0204811 A1 | 7/2016 | Goela et al. | |
| 2016/0294418 A1* | 10/2016 | Huang | H04M 13/13 |
| 2018/0076922 A1* | 3/2018 | Zhang | H04L 1/0009 |
| 2018/0241501 A1* | 8/2018 | Olsson | H04L 1/0009 |
| 2020/0021309 A1* | 1/2020 | Xu | H04M 13/09 |
| 2020/0067530 A1 | 2/2020 | Xu et al. | |

FOREIGN PATENT DOCUMENTS

| | | |
|---|---|---|
| CN | 103916220 A | 7/2014 |
| CN | 105656604 A | 6/2016 |
| EP | 2154856 A1 | 2/2010 |

OTHER PUBLICATIONS

International Search Report and Written Opinion—PCT/CN2016/100511—ISA/EPO—dated Jun. 19, 2017.

Mattias A., et al., "Polar Coding for Bidirectional Broadcast Channels with Common and Confidential Messages", IEEE Journal on Selected Areas in Communications, IEEE Service Center, Piscataway, US, vol. 31, No. 9, Sep. 1, 2013 (Sep. 1, 2013), XP011524962, pp. 1901-1908.

Naveen G., et al., "Polar Codes for broadcast channels", 2013 IEEE International Symposium on Information Theory, IEEE, Jul. 7, 2013 (Jul. 7, 2013), XP032496977, pp. 1127-1131.

Supplementary European Search Report—EP17854524—Search Authority—Munich—dated Jun. 3, 2020.

* cited by examiner

SUB-CHANNEL MAPPING

CROSS-REFERENCE TO RELATED APPLICATION(S)

This application is the U.S. national stage of PCT patent application number PCT/CN2017/092486 filed on Jul. 11, 2017, which claims priority to and the benefit of PCT patent application number PCT/CN2016/100511 filed on Sep. 28, 2016, the content of each of which is incorporated herein by reference.

INTRODUCTION

Various aspects described herein relate to communication, and more particularly but not exclusively, to mapping information to communication sub-channels.

In wireless communication systems, control channels are used to indicate important information for data channels. In general, the data channels might not be decoded if the control channel is not decoded correctly. Therefore, it is desirable for the block error probability of the control channel to be lower than that of the data channel. At the same time, it is desirable for the decoding latency for the control channel to be low enough to allow a receiver to handle the data channels that follow the control channel. Tail-biting convolutional codes (TBCCs) are widely used for encoding control channels because of comparable performance and low decoding complexity.

Two examples of control channel designs involve, first, separately encoded channels for users and, second, a commonly encoded control channel. For example, in a Long Term Evolution (LTE) system, the control channels are separately encoded with one code block of TBCC for each channel. Considering different wireless channel qualities, the coded block may be repeated from 1 to 8 times. This design attempts to guarantee the performance of cell edge users with 8 times repetition. However, overhead is relatively high due to the separate encoding of the code blocks. In contrast, in a WiMAX system, the control channels are combined with one code block of TBCC. Thus, there is only one cyclic redundancy check (CRC) appended to check for all the control channels. A drawback of this solution is that all the users must decode all the control channels. Since channel conditions are generally worse at a cell edge, this solution negatively impacts the ability of a cell edge user to efficiently decode the user's control information. In view of the above, there is a need for techniques that can effectively balance the service needs of users that have good channel quality and users at a cell-edge.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: obtain first information for a first user and second information for a second user; map the first information to a first Polar code sub-channel and the second information to a second Polar code sub-channel; encode the first information and the second information according to the mapping to provide a single code block; and output the code block.

Another aspect of the disclosure provides a method for communication including: obtaining first information for a first user and second information for a second user; mapping the first information to a first Polar code sub-channel and the second information to a second Polar code sub-channel; encoding the first information and the second information according to the mapping to provide a single code block; and outputting the code block.

Another aspect of the disclosure provides an apparatus configured for communication. The apparatus including: means for obtaining first information for a first user and second information for a second user; means for mapping the first information to a first Polar code sub-channel and the second information to a second Polar code sub-channel; means for encoding the first information and the second information according to the mapping to provide a single code block; and means for outputting the code block.

Another aspect of the disclosure provides a non-transitory computer-readable medium storing computer-executable code, including code to: obtain first information for a first user and second information for a second user; map the first information to a first Polar code sub-channel and the second information to a second Polar code sub-channel; encode the first information and the second information according to the mapping to provide a single code block; and output the code block.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
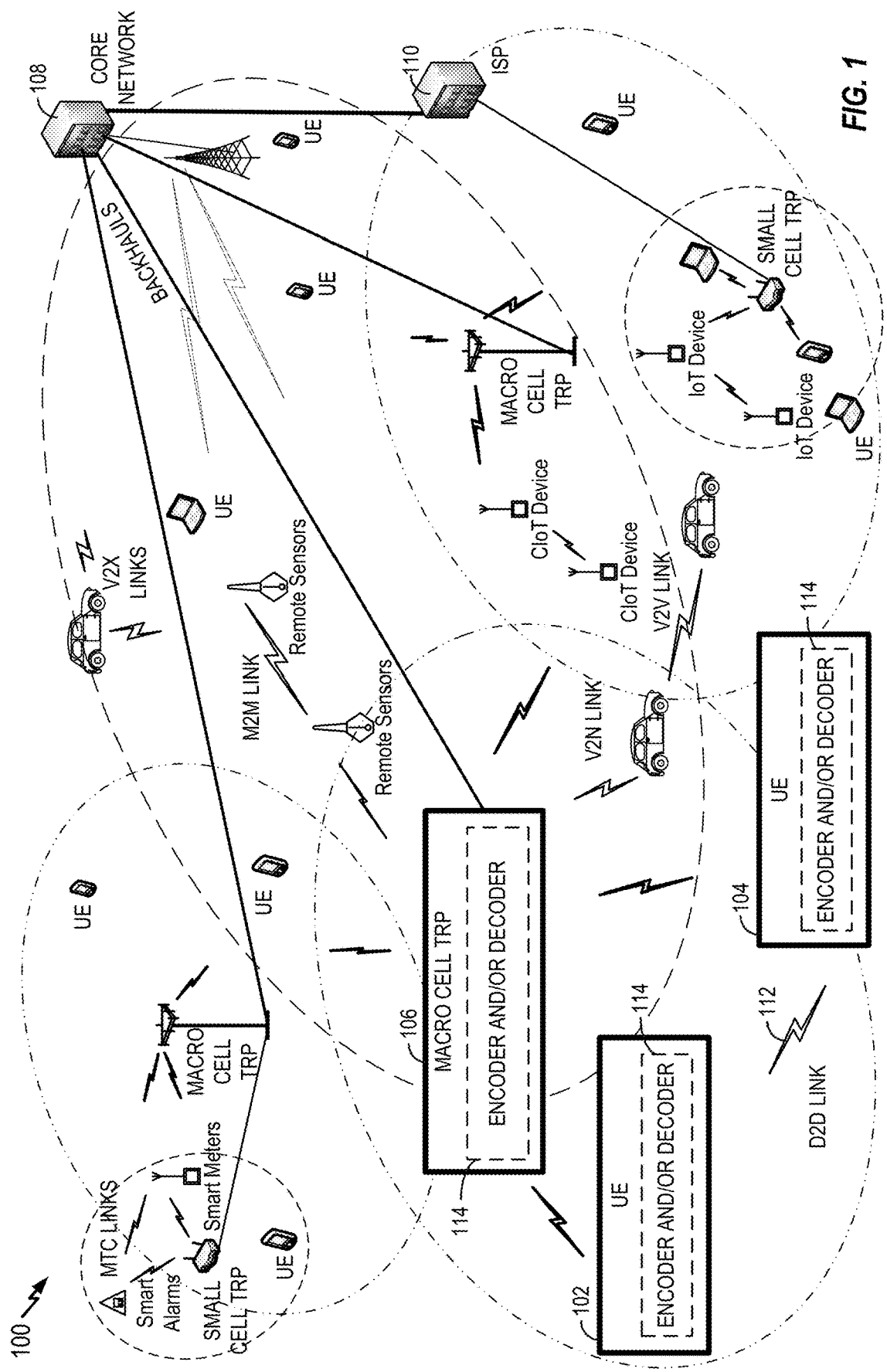
FIG. 1 is a block diagram of an example communication system in which aspects of the disclosure may be used.

Various aspects of the disclosure relate to mapping different information to different sub-channels. For example, information for a first user may be mapped to a first Polar code sub-channel and information for a second user may be mapped to a second Polar code sub-channel. In some aspects, the mapping may be unbalanced in that different information is mapped to different sub-channels according to the quality (e.g., in terms of error probability) of the sub-channels and a criterion associated with the information. For example, control information for users that are experiencing the worst channel quality (e.g., in a wireless communication channel) may be mapped to the Polar code sub-channels that have the best error probability.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, peer devices, and so on). In some implementations, one or more of the components of the system 100 may communicate with each other directedly via a device-to-device (D2D) link 112 or some other similar type of direct link.

Communication of information between two or more of the components of the system 100 may involve encoding the information. For example, the TRP 106 may encode data or control information that the TRP 106 sends to the UE 102 or the UE 104. As another example, the UE 102 may encode data or control information that the UE 102 sends to the TRP 106 or the UE 104. The encoding may involve block coding such as Polar coding. In accordance with the teachings herein, one or more of the UE 102, the UE 104, the TRP 106, or some other component of the system 100 may include an encoder and/or decoder 114 for mapping inputs to polar code sub-channels and/or for identifying different information characteristics. For example, as discussed in more detail below, an encoder may map information from different inputs (e.g., different users) to different Polar code sub-channels based on a mapping criterion.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links Network-to-device links may include, without limitation, uplinks (or reverse links), downlinks (or forward links), and vehicle-to-network (V2N) links.

Example Communication Components

Figure 2:
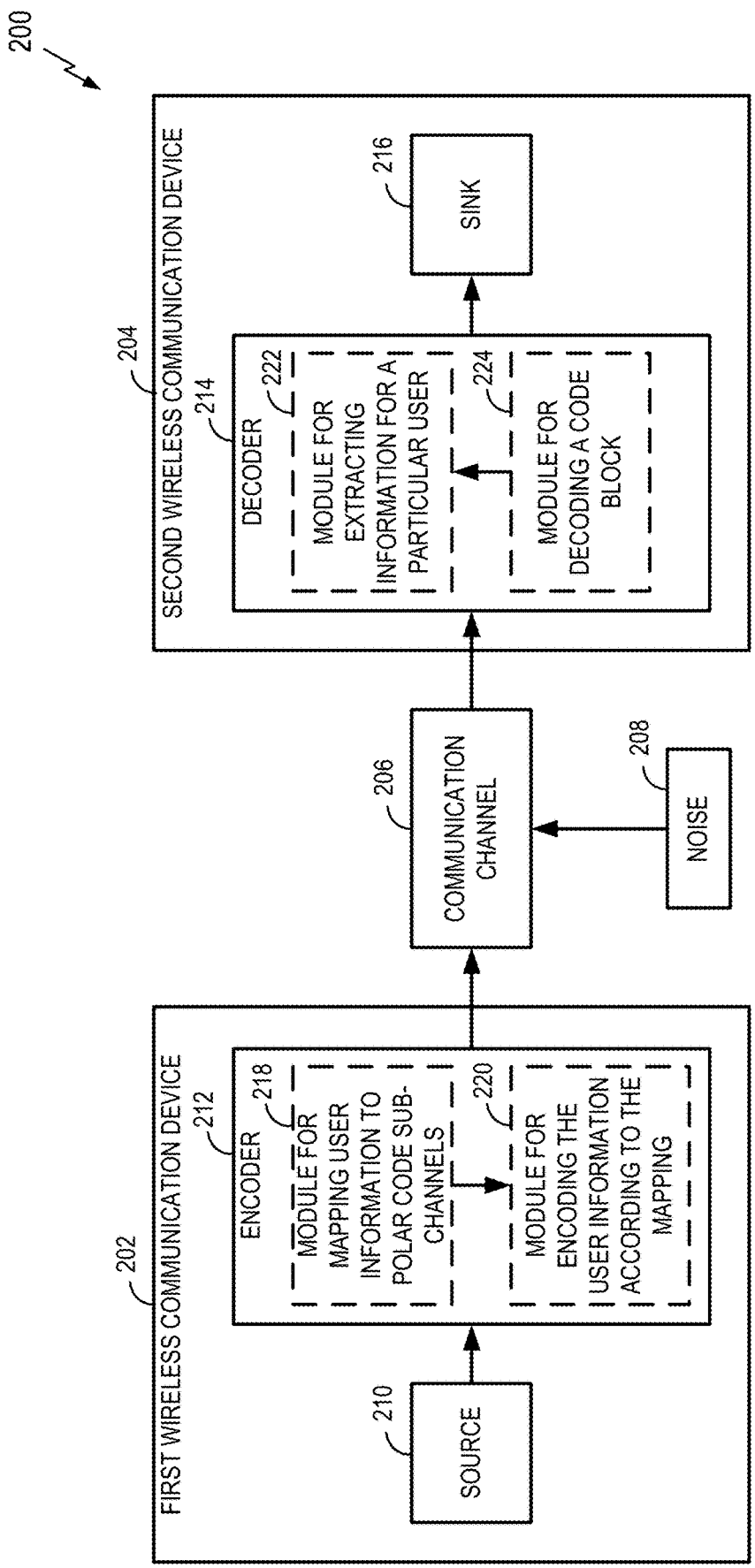
FIG. 2 is a block diagram of example communication devices in which aspects of the disclosure may be used.

FIG. 2 is a schematic illustration of a wireless communication system 200 that includes a first wireless communication device 202 and a second wireless communication device 204 that may use the teachings herein. In some implementations, the first wireless communication device 202 or the second wireless communication device 204 may correspond to the UE 102, the UE 104, the TRP 106, or some other component of FIG. 1.

In the illustrated example, the first wireless communication device 202 transmits a message over a communication channel 206 (e.g., a wireless channel) to the second wireless communication device 204. One issue in such a scheme that may be addressed to reliably communicate the message is to take into account noise 208 introduced in the communication channel 206.

Block codes or error correcting codes are frequently used to provide reliable transmission of messages over noisy channels. In a typical block code, an information message or sequence from an information source 210 at the first (transmitting) wireless communication device 202 is split up into blocks, each block having a length of K bits. An encoder 212 mathematically adds redundancy to the information message, resulting in codewords having a length of N, where N>K. Here, the code rate R is the ratio between the message length and the block length (i.e., R=K/N). Exploitation of this redundancy in the encoded information message is a key to reliably receiving the transmitted message at the second (receiving) wireless communication device 204, whereby the redundancy enables correction for bit errors that may occur due to the noise 208 imparted on the transmitted message. That is, a decoder 214 at the second (receiving) wireless communication device 204 can take advantage of the redundancy to reliably recover the information message provided to an information sink 216 even though bit errors may occur, in part, due to the addition of the noise 208 to the channel 206.

Many examples of such error correcting block codes are known to those of ordinary skill in the art, including Hamming codes, Bose-Chaudhuri-Hocquenghem (BCH) codes, and turbo codes, among others. Some existing wireless communication networks utilize such block codes. For example, 3GPP LTE networks may use turbo codes. However, for future networks, a new category of block codes, called Polar codes, presents a potential opportunity for reliable and efficient information transfer with improved performance relative to other codes.

Polar codes are linear block error correcting codes where channel polarization is generated with a recursive algorithm that defines polar codes. Polar codes are the first explicit codes that achieve the channel capacity of symmetric binary-input discrete memoryless channels. That is, polar codes achieve the channel capacity (the Shannon limit) or the theoretical upper bound on the amount of error-free information that can be transmitted on a discrete memoryless channel of a given bandwidth in the presence of noise. This capacity can be achieved with a simple successive cancellation (SC) decoder.

One property of Polar codes is that the bit-error probabilities of different sub-channels may have a relatively large range. The disclosure related in some aspects to exploiting this property of Polar codes for sending different types of information (e.g., control channel information for different users, information having different priorities, etc.). For example, because Polar codes may provide better performance and comparable decoding complexity, Polar codes are particularly suitable for sending control channel information. Thus, in some aspects, the proposed scheme may be more efficient than existing algorithms.

Accordingly, the disclosure relates in some aspects, to mapping information to Polar code sub-channels. For example, in FIG. 2, the encoder 212 may include a module for mapping user information to Polar code channels 218 (e.g., mapping information for different users to different Polar code channels). In addition, the encoder 212 may include a module for encoding the user information according to the mapping 220. The first wireless communication device 202 (e.g., a transmit receive point) then transmits (e.g., broadcasts) the resulting code block.

The second wireless communication device 204 (e.g., a user equipment) receives the code block with the user information. The decoder 214 includes a module for decoding the code block 224. The decoded code block is then provided to a module for extracting the information for a particular user 222 (e.g., a user of the second wireless communication device 204).

LTE and WiMAX Control Channel Encoding

Figure 3:
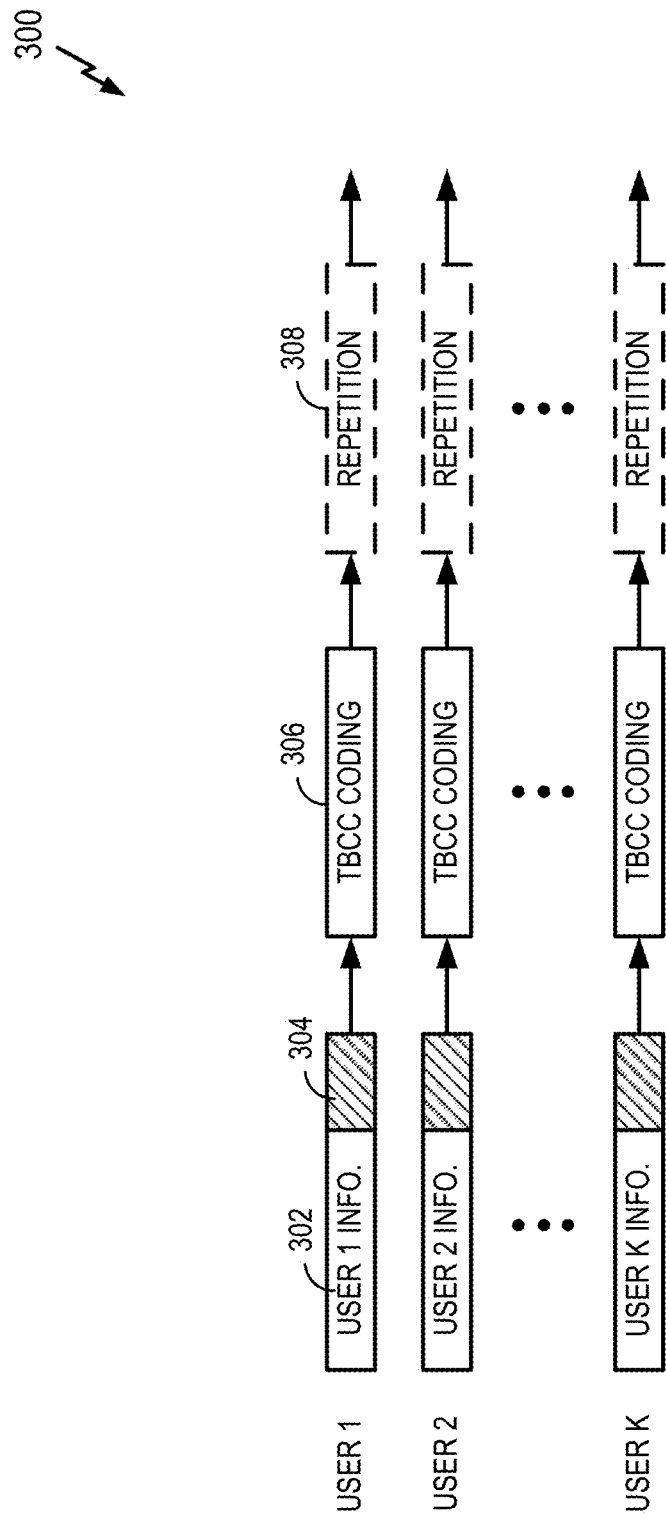
FIG. 3 is a diagram of a first example of a control channel.
Figure 4:
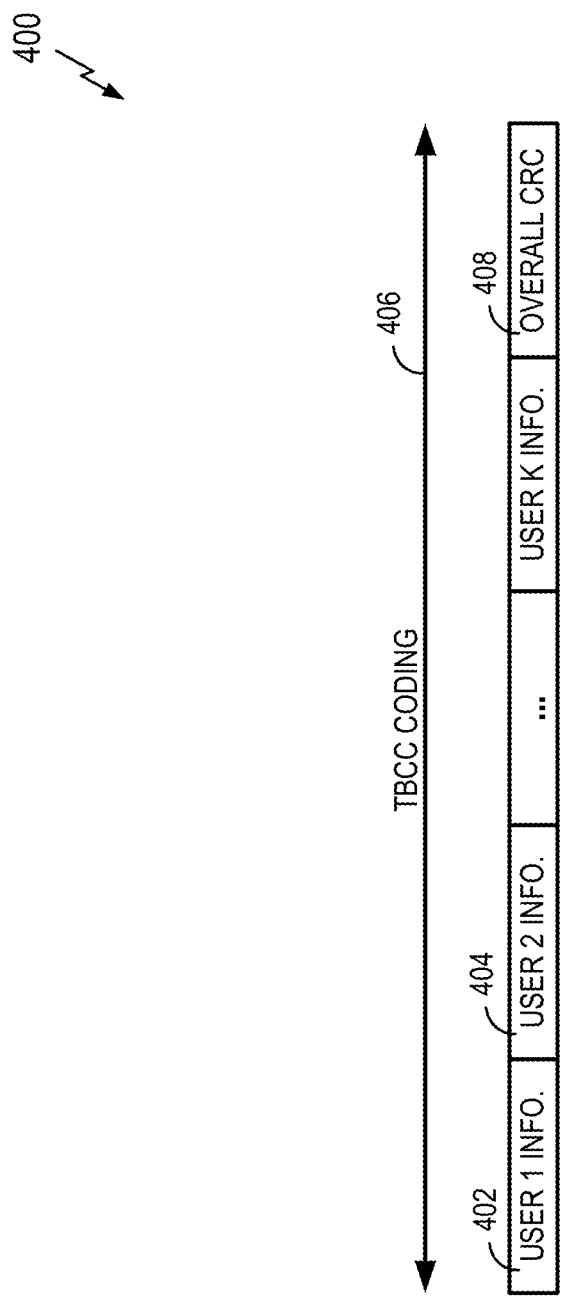
FIG. 4 is a diagram of a second example of a control channel.

Two existing control channel schemes are depicted in FIGS. 3 and 4. FIG. 3 illustrates an example of encoding used in LTE. FIG. 4 illustrates an example of encoding used in WiMAX.

Referring initially to FIG. 3, in a multi-user encoding scheme 300 for LTE, the control information of each user with CRC is separately encoded with a TBCC code. Repetition may be applied before mapping the encoded bits onto the applicable resource (e.g., a wireless communication channel). For example, user 1 information 302 with CRC 304 (e.g., 16-bit CRC) is separately encoded with a TBCC code 306 and subjected to repetition 308. Similar operations are applicable for the other users (user 2 through user K).

In an example implementation, the repetition 308 is up to 8 times depending on the channel quality. For TBCC encoding, each bit has approximately the same decode error probability. A radio network temporary identifier (RNTI), e.g., 16 bits in length, may be masked into the CRC to differentiate the control information for each user. In an example implementation, the maximum number of blind detection times is 44 for each user (receiver) to obtain the desired control information, considering the repetition times and control information formats.

There are several drawbacks with the LTE encoding described above. One drawback is that the number of supported users is limited by the resource mapping. Another other drawback is that the complexity and latency is relatively high due to the use of blind detection at the receiver.

Referring now to FIG. 4, in a multi-user encoding scheme 400 for WiMAX, the control information of all the users (e.g., user 1 information 402, user 2 information 404, etc.) is combined and encoded using a TBCC 406. A single CRC 408 is applied for validation checking of all of the control information. This implies that the same coding rate and modulation order are used for all of the users despite the different channel quality the users may experience. To guarantee the decoding performance of the cell edge users with lower channel quality, the coding rate for the users with good channel quality cannot be as high as would otherwise be possible. Consequently, the encoding is overdesigned with respect to the users with good channel quality.

Thus, in the WiMAX encoding described above, one drawback is that the design is not flexible for different users with different channel quality. In addition, the performance of the TBCC might be not high enough for some applications.

Polar Codes

The disclosure relates in some aspects to using Polar codes to send different types of information (e.g., control channel information for different users, information having different priorities, etc.). A brief introduction to Polar codes follows.

Figure 5:
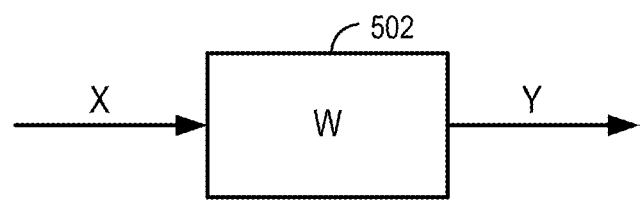
FIG. 5 is a diagram of an example of a representation of a communication channel.
Figure 5:
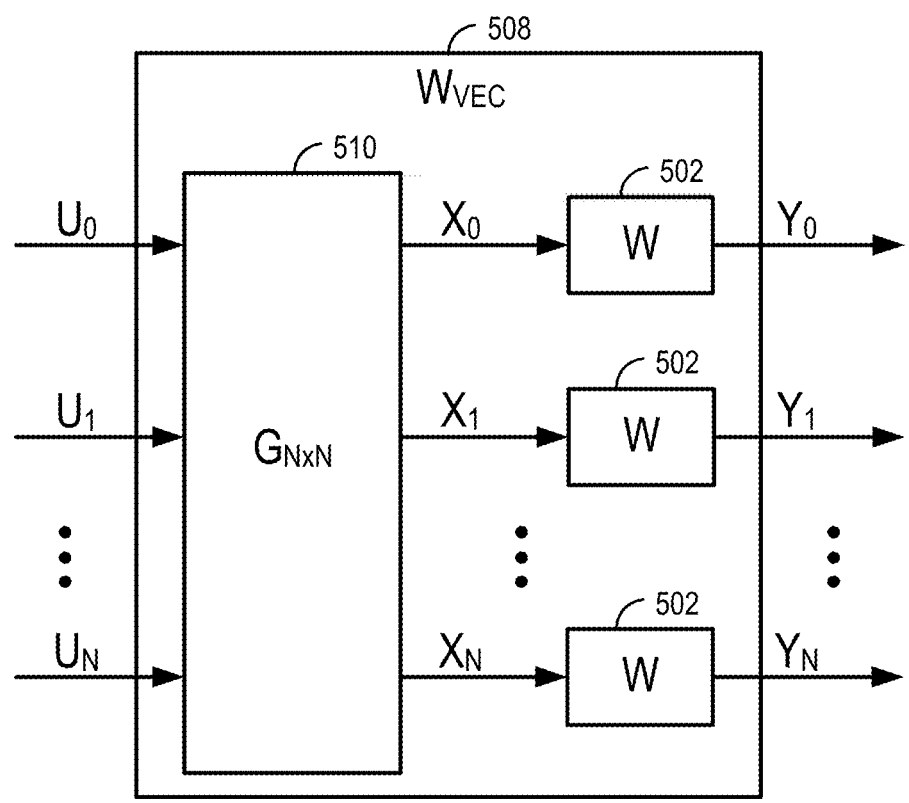

Referring to the top of FIG. 5, a binary-input discrete memoryless channel 502 may be represented as W: X→Y, where X is an input and Y is an output of a channel W. The capacity C of this channel is: C=I(X;Y), where I represents the mutual information function.

Referring to the bottom of FIG. 5, an effective channel $W_{VEC}$ 508 for multiple inputs may be represented as follows. For the example of a binary-input, 0≤C≤1, a transformation may include the following operations. Starting with N copies of the channel W 502; a one-to-one mapping $G_{N \times N}$ 510 is applied from U inputs ($U_0, U_1, \ldots, U_N$) to X outputs ($X_0, X_1, \ldots, X_N$) as set forth in Equation 1 of Table 1. The effective channel $W_{VEC}$ 508 is thus created, with $X^N = U^N \cdot G_{N \times N}$. For the relatively simple case of N=2, $G_{N \times N}$ may be represented as set forth in Equation 2 of Table 1.

TABLE 1

$X^N = U^N \cdot G_{N \times N}$, where $G_{N \times N} = \{0, 1\}^N \to \{0, 1\}^N$.     EQUATION 1

$G_{2 \times 2} = \begin{bmatrix} 1 & 0 \\ 1 & 1 \end{bmatrix}$     EQUATION 2

TABLE 1-continued $U_0 = X_0 \oplus X_1 = Y_{01} \oplus Y_1$ (corresponding to a parity-check)     EQUATION 3
$U_1 = X_1 = X_0 \oplus U_0$ (corresponding to repetition)
$\varepsilon^- = 1 - (1 - \varepsilon)^2 = 2\varepsilon - \varepsilon^2$     EQUATION 4
$\varepsilon^+ = \varepsilon^2$     EQUATION 5

Figure 6:
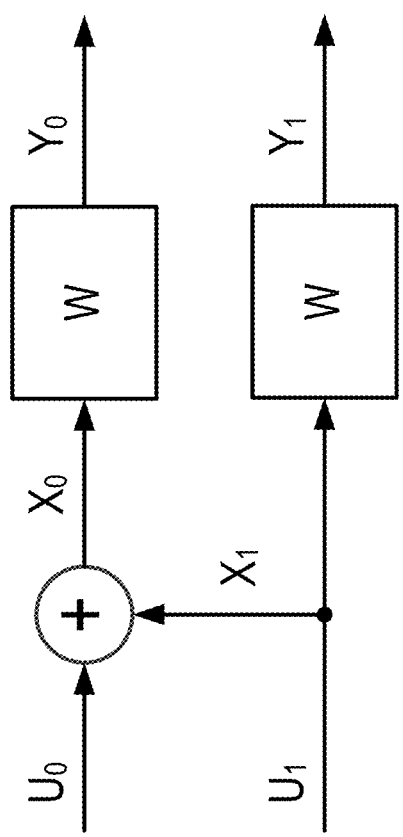
FIG. 6 is a diagram of an example of polarization for Polar codes.

Assuming W is a binary erasure channel (BEC) with an erasure probability 'ε', the relationships set forth in Equation 3 of Table 1 are true (with reference to the schematic 600 of FIG. 6). In FIG. 6, $U_0$ is an input and $Y_0$ is an output for a channel $W_0$. Similarly, $U_1$ is an input and $Y_1$ is an output for a channel $W_1$.

For the channel $W_0$: $U_0 \to Y^N$, the erasure probability ($\varepsilon^-$) is set forth in Equation 4 of Table 1. For the channel $W_1$: $U_1 \to (Y^N, U_0)$, the erasure probability ($\varepsilon^+$) is set forth in Equation 5 of Table 1. In view of the above, $W_1$ is a better channel than $W_0$. Accordingly, $U_1$ will have a higher reliability than $U_0$. The above operation can be performed recursively, yielding more polarization across N.

Polar Code Encoder Structure

Figure 7:
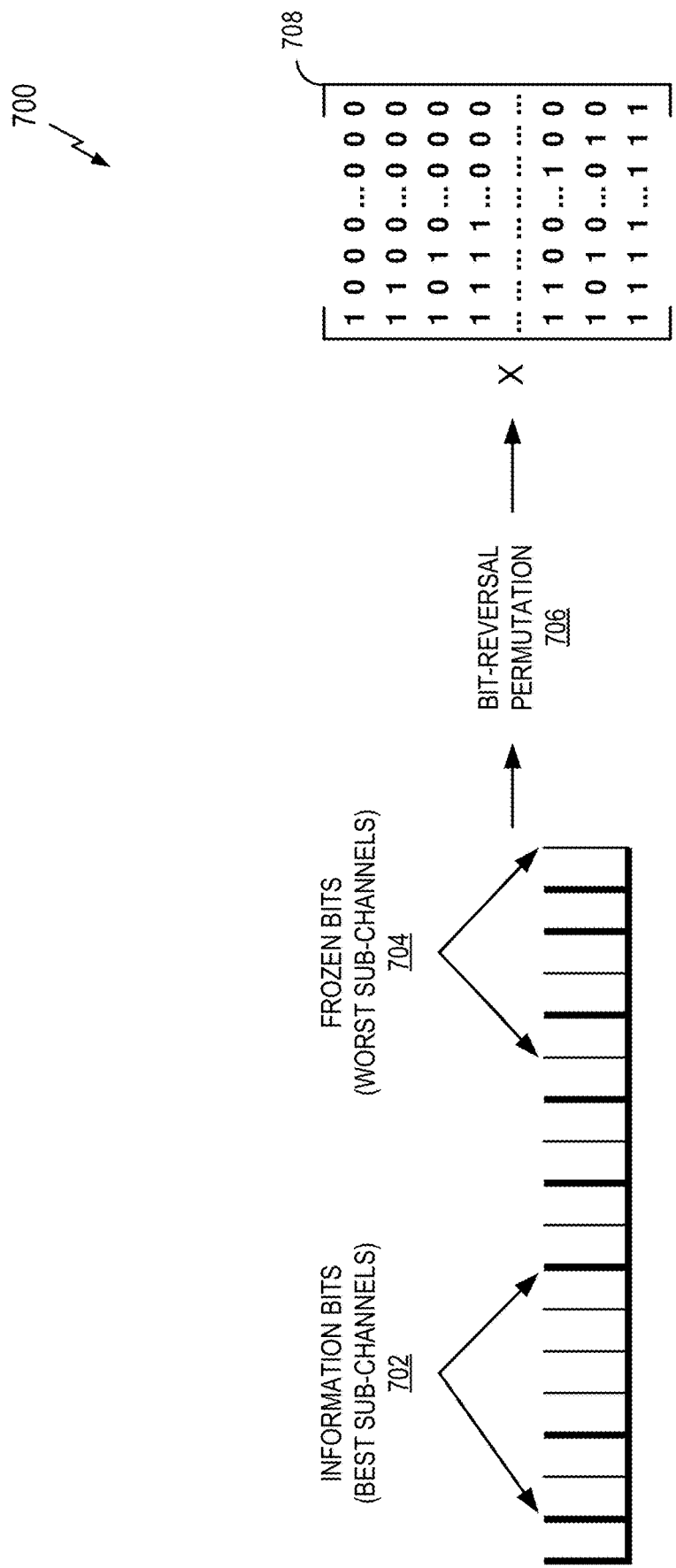
FIG. 7 is a diagram of an example structure of an encoder based on Polar codes.

An example of an encoder structure 700 for Polar codes is depicted in FIG. 7. As discussed above, the quality of different Polar code sub-channels may be quite different. In some implementations, the sub-channels correspond to the bit channels between the input of the encoder in the transmitter and the output of a successive cancellation (SC) decoder in the receiver.

In the example, of FIG. 7, the Polar code sub-channels are allocated into subsets, ranging from the best sub-channels to the worst sub-channels, based on the corresponding error probability associated with each sub-channel as discussed in the previous section. In this example, the information bits 702 are put on the best sub-channels while frozen bits 704 (with zero values) are put on the worst sub-channels. A bit-reversal permutation 706 is used to provide the output bits of the decoder in a desired sequence. The encoding is performed after multiplying by a Hadamard matrix 708. The generator matrices of Polar codes are comprised of the rows of a Hadamard matrix. The rows corresponding to low error probabilities of an SC decoder are selected for information bits while the remaining rows are for frozen bits.

It may thus be seen that the Polar codes are one type of block codes (N, K), where N is the code block size (codeword length) and K is the number of information bits. With polar codes, the codeword length N is a power-of-two (e.g., 256, 512, 1024, etc.) because the original construction of a polarizing matrix is based on the Kronecker product of $$\begin{bmatrix} 1 & 0 \\ 1 & 1 \end{bmatrix}.$$

Mapping Scheme for Polar Codes

Figure 8:
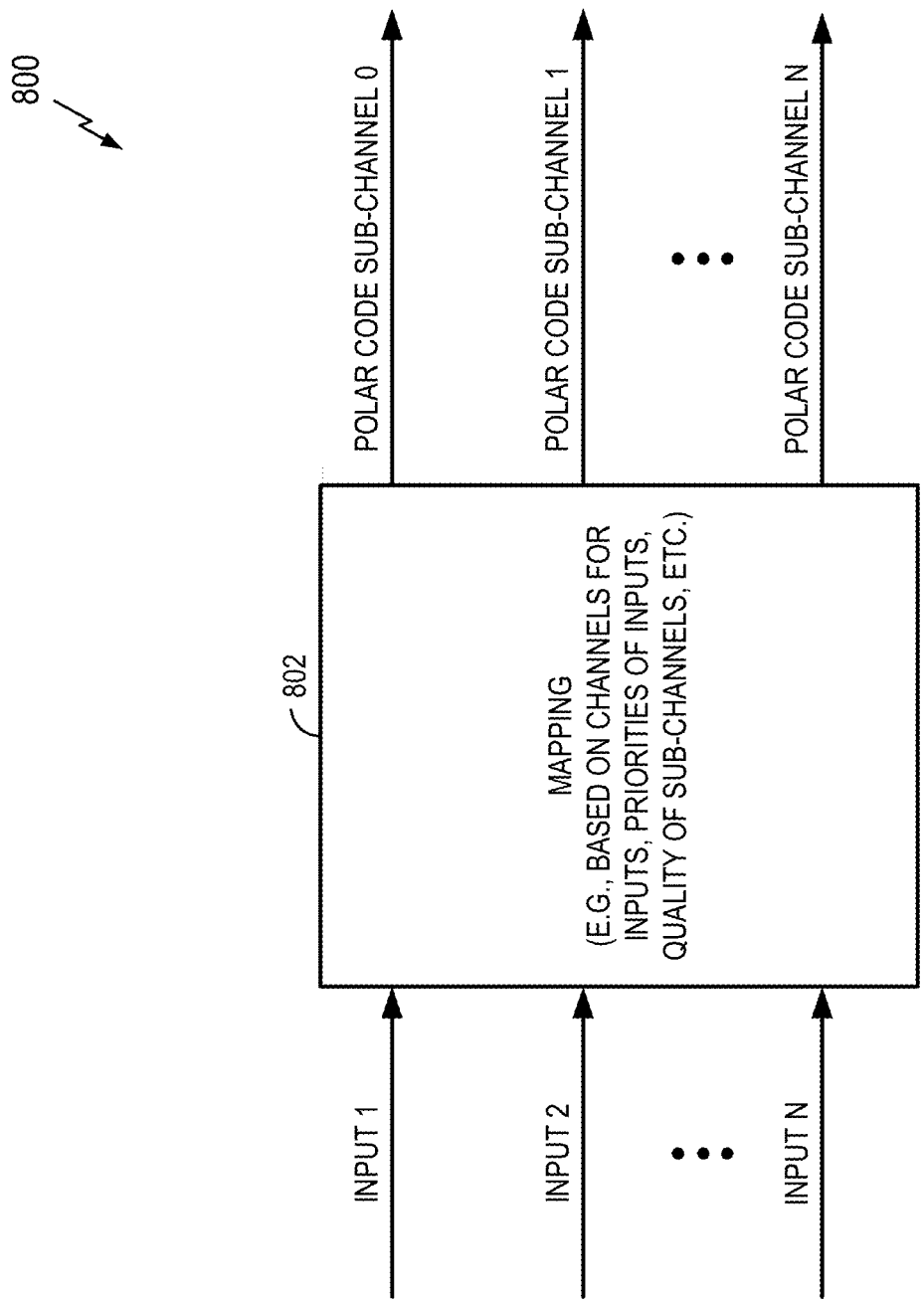
FIG. 8 is a diagram of an example of a Polar code sub-channel mapping in accordance with some aspects of the disclosure.

Referring to FIG. 8, the disclosure relates in some aspects to mapping 802 different inputs to different Polar code sub-channels. Herein a set of inputs (INPUT 1 to INPUT N) are mapped to a set of Polar code subchannels (POLAR CODE SUB-CHANNEL 0 to POLAR CODE SUB-CHANNEL N). The mapping 802 may take different forms in different implementations.

In some aspects, the mapping 802 may be based on one or more characteristics associated with the inputs. For example, information for different users could be mapped to different Polar code sub-channels. As another example, different traffic experiencing different wireless communication qualities (e.g., due to the use of different wireless communication channels to send the different traffic) could be mapped to different Polar code sub-channels. As yet another example, information having different priorities could be mapped to different Polar code sub-channels. In addition, control information, data, or other types of information may be mapped. Other input criteria could be used in other examples.

In some aspects, the mapping 802 may be based on one or more characteristics associated with the Polar code sub-channels. For example, certain inputs could be mapped to certain Polar code sub-channels depending on the different error probabilities associated with the different Polar code sub-channels. Other sub-channel criteria could be used in other examples.

Figure 9:
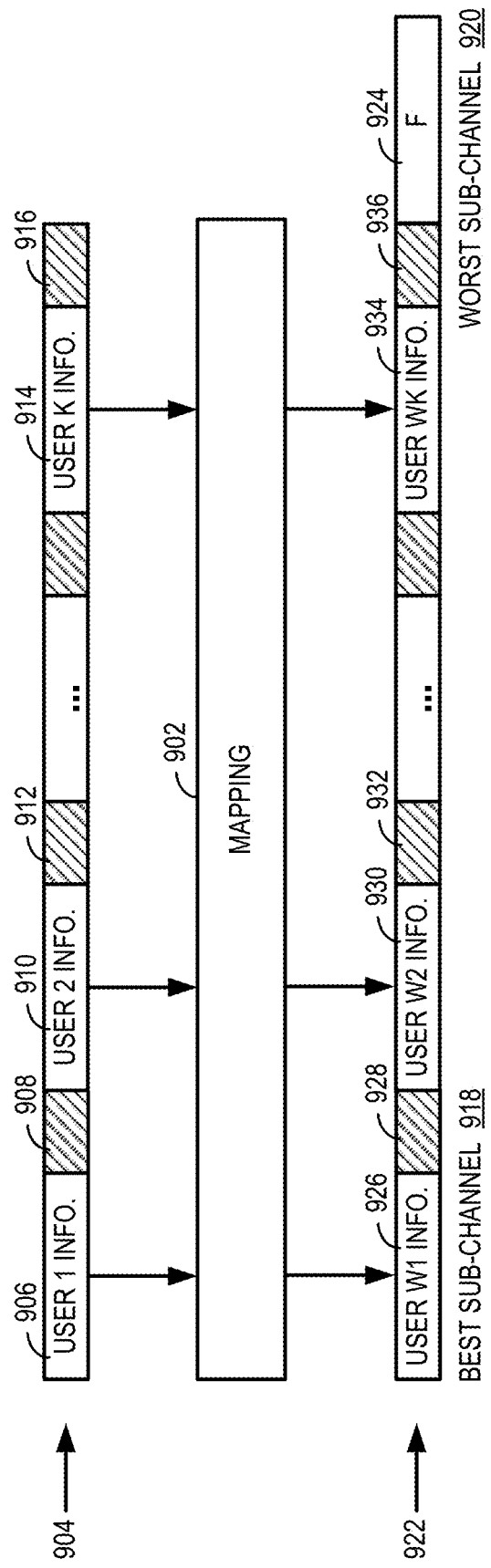
FIG. 9 is a diagram of another example of a Polar code sub-channel mapping in accordance with some aspects of the disclosure.

FIG. 9 illustrates an example of a control channel design using Polar codes. For purposes of explanation, a mapping 902 of user information 904 to Polar code sub-channels in this example will be described in the context of mapping user control information for users experiencing different wireless communication channel quality to different Polar code sub-channels. It should be appreciated that such a mapping may take other forms in other implementations. For example, information other than control information could be mapped, and the information need not be associated with different users.

The user information 904 includes information from several users. In the example of FIG. 9, the user information 904 includes user 1 information 906 (with optional associated CRC 908), user 2 information 910 (with optional associated CRC 912), through user K information 914 (with optional associated CRC 916). As discussed herein, the CRC may be masked with a user identifier or some other information.

In some implementations (e.g., as shown in FIG. 9), the control information of each user has same size and is appended with m-bit CRC. The length of CRC may be set to meet the requirement of both miss-detection probability and false-alarm probability. To improve the decoding performance, the CRC bits for each user can be used for a CRC-aided list SC decoding algorithm for Polar codes.

In some aspects, the mapping may involve (or follow) sorting the wireless communication channel quality of each user and denoting the corresponding information as W1 to WK. For example, after sorting, a user W1 may correspond to the user with the worst wireless communication channel quality while a user WK may correspond to the user with the best wireless communication channel quality.

The sub-channels of Polar codes are sorted as well. For example, the quality (e.g., bit error probability) for the sub-channels may be progressively worse traversing the sub-channels from left (the best sub-channel 918) to right (the worst subchannel 920). In some aspects, a density evolution (DE) algorithm or a Gaussian approximation (GA) algorithm may be used to determine the bit-error probability of each sub-channel.

As a result of the encoding process, the user information 904 is aggregated together to form a single coded block 922 for Polar codes. The sorted user information is allocated into the sub-channels of Polar codes on the positions except those for frozen bits. That is, the worst sub-channels are allocated for frozen bits with zero values. This is indicated by the block F 924 of the coded block 922.

In an example implementation, to obtain better performance, the control information of the user with the worse channel quality will be mapped to the better Polar code sub-channels. For example, in the example of FIG. 9, the control information of user W1 (user W1 information 926 with optional associated CRC 928) is allocated into the best sub-channel(s). Users with progressively better wireless communication channel quality will be mapped to progressively worse Polar code sub-channels. Thus, the control information of the user W2 (user W2 information 930 with optional associated CRC 932) is allocated into the next best sub-channel(s), and this mapping continues until the control information of the user WK (user W1 information 934 with optional associated CRC 936) is mapped to the worst, non-frozen, Polar code sub-channel. By mapping the traffic with poorer wireless communication quality onto the better Polar code sub-channels, repetition might not be needed (e.g., in contrast with the LTE approach discussed above).

The proposed algorithm may thus have several advantages. For example, the properties of Polar codes may be fully used to provide unbalance protection (e.g., unbalanced sub-channel distribution over the Polar codes) for different users with variable channel quality (or information with different priorities, and so on). In addition, although the sets of control information for different users are combined together in the example of FIG. 9, each user can do a CRC check separately after decoding. As long as the CRC check passes, the control information can be used even if the overall code word is not decoded correctly. Furthermore, the combined information size (e.g., 100 bits, several hundred bits, or some other size) may be particularly advantageous for the use of Polar codes. In that range, the Polar codes may outperform codes such as Turbo codes and TBCC. For example, if individual control information takes up from 30-50 bits, a performance gain may be achieved by aggregating these individual blocks into a Polar code block (e.g., with a size of 300 bits). Also, blind detection need not be used for the proposed algorithm, thereby reducing the decoding complexity. Moreover, when the same information block size is used for each user, a receiver may be able to readily identify the individual user blocks in the code block 922 based on the number of users (e.g., signaled to the receiver) and the length of the code block 922. In other implementations where the individual user blocks are not the same size, an indication of these user block sizes may be signaled to the receiver.

Example Encoder and Decoder

Figure 10:
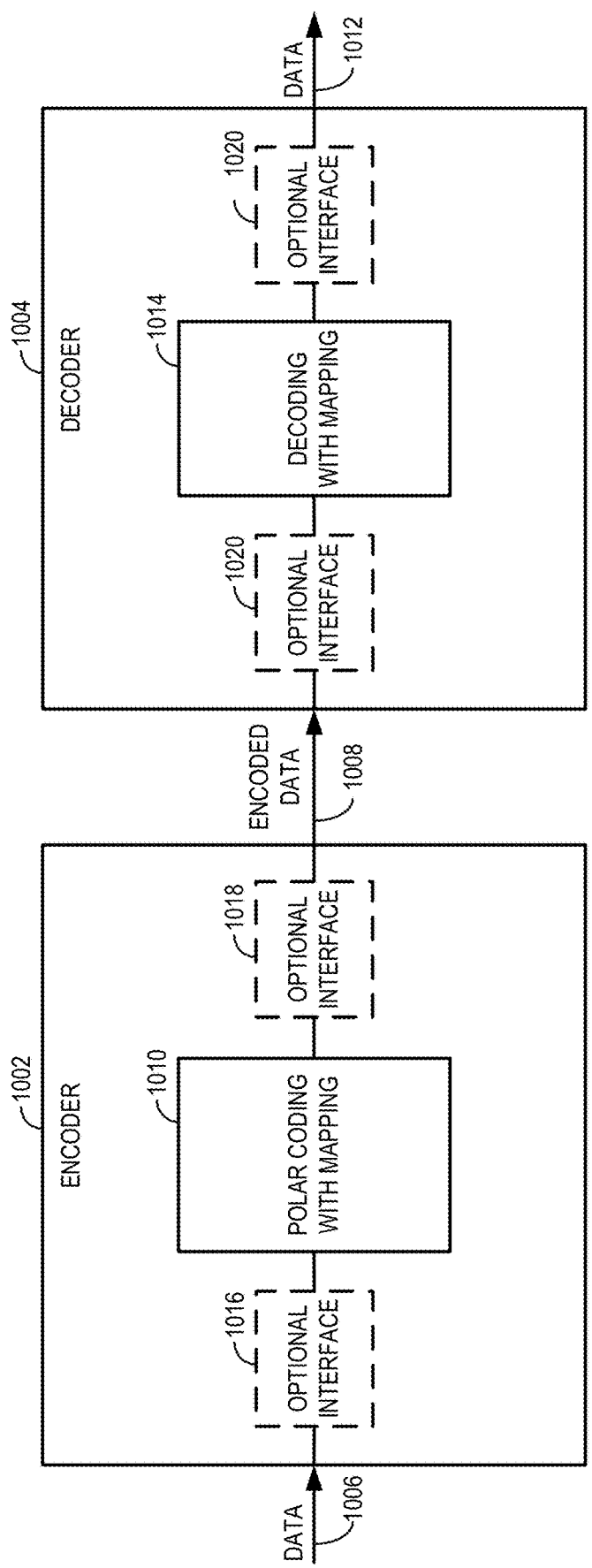
FIG. 10 is a block diagram of example encoder and decoder devices in accordance with some aspects of the disclosure.

FIG. 10 illustrates an example encoder 1002 and an example decoder 1004 constructed in accordance with the teachings herein. In some aspects, the encoder 1002 and the decoder 1004 may correspond to the encoder 212 and the decoder 214 of FIG. 2, respectively.

The encoder 1002 encodes data 1006 to generate encoded data 1008. In accordance with the teachings herein, the encoder 1002 may include functionality for Polar coding with mapping 1010.

The decoder 1004 decodes the encoded data 1008 (e.g., after transmission over a communication channel, not shown) to provide recovered data 1012. In accordance with the teachings herein, the decoder 1004 may include functionality for decoding (e.g., SC decoding) with mapping 1014.

In some implementations, the encoder 1002 may include an interface 1016, an interface 1018, or both. Such an interface may include, for example, an interface bus, bus drivers, bus receivers, other suitable circuitry, or a combination thereof. For example, the interface 1016 may include receiver devices, buffers, or other circuitry for receiving a signal. As another example, the interface 1018 may include output devices, drivers, or other circuitry for sending a signal. In some implementations, the interfaces 1016 and 1018 may be configured to interface one or more other components of the encoder 1002 (other components not shown in FIG. 10).

In some implementations, the decoder 1004 may include an interface 1020, an interface 1022, or both. Such an interface may include, for example, an interface bus, bus drivers, bus receivers, other suitable circuitry, or a combination thereof. For example, the interface 1020 may include receiver devices, buffers, or other circuitry for receiving a signal. As another example, the interface 1022 may include output devices, drivers, or other circuitry for sending a signal. In some implementations, the interfaces 1020 and 1022 may be configured to interface one or more other components of the decoder 1004 (other components not shown in FIG. 10).

The encoder 1002 and the decoder 1004 may take different forms in different implementations. In some cases, the encoder 1002 and/or the decoder 1004 may be an integrated circuit. In some cases, the encoder 1002 and/or the decoder 1004 may be included in an integrated circuit that includes other circuitry (e.g., a processor and related circuitry).

First Example Apparatus

Figure 11:
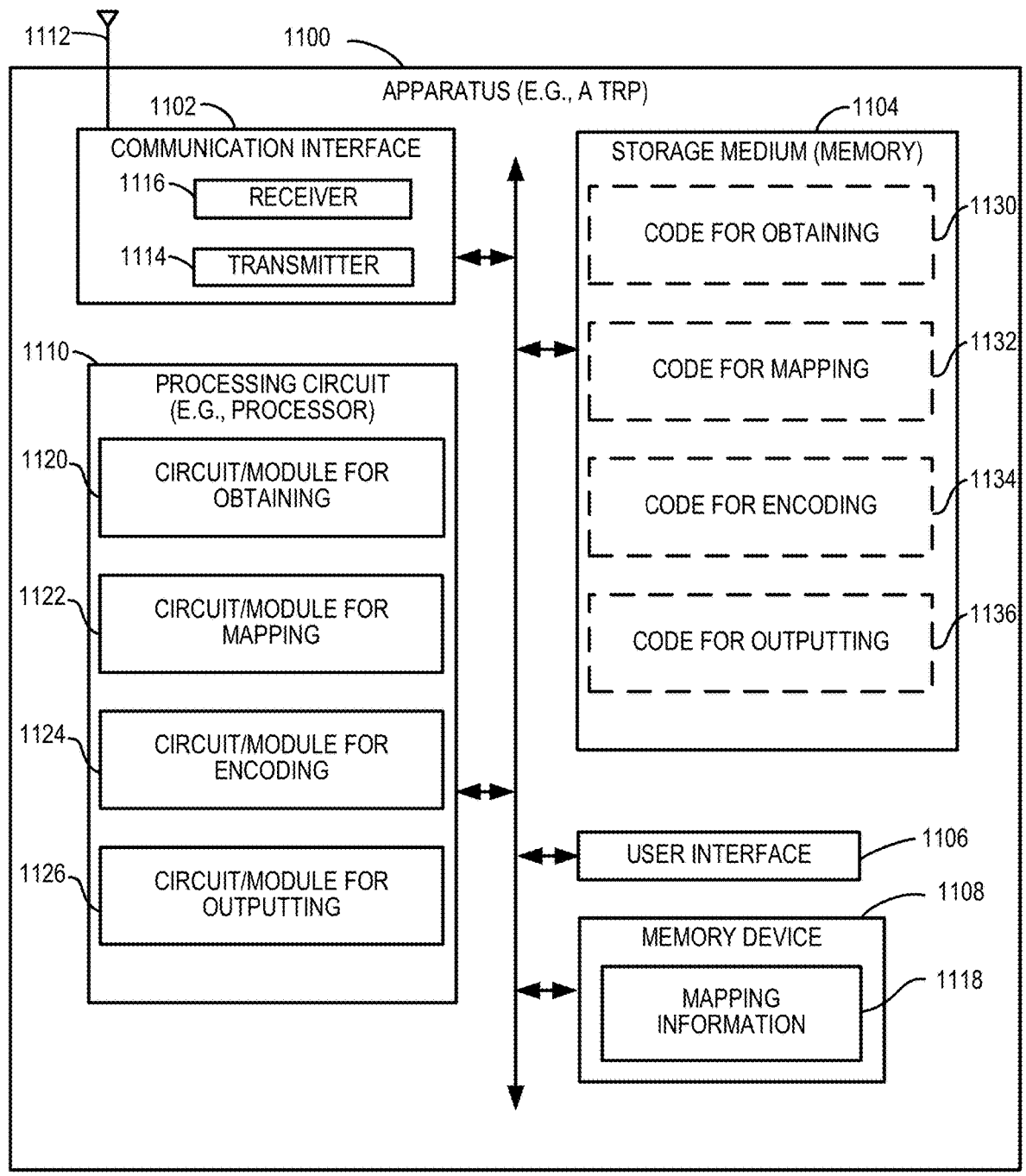
FIG. 11 is a block diagram illustrating an example hardware implementation for an apparatus (e.g., an electronic device) that provides encoding in accordance with some aspects of the disclosure.

FIG. 11 is an illustration of an apparatus 1100 that may use encoding according to one or more aspects of the disclosure. The apparatus 1100 could embody or be implemented within a TRP, a gNB, UE, an access point, or some other type of device that supports encoding. In various implementations, the apparatus 1100 could embody or be implemented within an access terminal, an access point, or some other type of device. In various implementations, the apparatus 1100 could embody or be implemented within a computer, a server, a personal computer, a mobile phone, a smart phone, a tablet, a portable computer, a sensor, an alarm, a vehicle, a machine, an entertainment device, a medical device, or any other electronic device having circuitry.

The apparatus 1100 includes a communication interface 1102 (e.g., at least one transceiver), a storage medium 1104, a user interface 1106, a memory device 1108, and a processing circuit 1110 (e.g., at least one processor). These components can be coupled to and/or placed in electrical communication with one another via a signaling bus or other suitable component, represented generally by the connection lines in FIG. 11. The signaling bus may include any number of interconnecting buses and bridges depending on the specific application of the processing circuit 1110 and the overall design constraints. The signaling bus links together various circuits such that each of the communication interface 1102, the storage medium 1104, the user interface 1106, and the memory device 1108 are coupled to and/or in electrical communication with the processing circuit 1110. The signaling bus may also link various other circuits (not shown) such as timing sources, peripherals, voltage regulators, and power management circuits, which are well known in the art, and therefore, will not be described any further.

The communication interface 1102 may be adapted to facilitate wireless communication of the apparatus 1100. For example, the communication interface 1102 may include circuitry and/or programming adapted to facilitate the communication of information bi-directionally with respect to one or more communication devices in a network. Thus, in some implementations, the communication interface 1102 may be coupled to one or more antennas 1112 for wireless communication within a wireless communication system. In some implementations, the communication interface 1102 may be configured for wire-based communication. For example, the communication interface 1102 could be a bus interface, a send/receive interface, or some other type of signal interface including drivers, buffers, or other circuitry for outputting and/or obtaining signals (e.g., outputting signal from and/or receiving signals into an integrated circuit). The communication interface 1102 can be configured with one or more standalone receivers and/or transmitters, as well as one or more transceivers. In the illustrated example, the communication interface 1102 includes a transmitter 1114 and a receiver 1116.

The memory device 1108 may represent one or more memory devices. As indicated, the memory device 1108 may maintain mapping information 1118 along with other information used by the apparatus 1100. In some implementations, the memory device 1108 and the storage medium 1104 are implemented as a common memory component. The memory device 1108 may also be used for storing data that is manipulated by the processing circuit 1110 or some other component of the apparatus 1100.

The storage medium 1104 may represent one or more computer-readable, machine-readable, and/or processor-readable devices for storing programming, such as processor executable code or instructions (e.g., software, firmware), electronic data, databases, or other digital information. The storage medium 1104 may also be used for storing data that is manipulated by the processing circuit 1110 when executing programming. The storage medium 1104 may be any available media that can be accessed by a general purpose or special purpose processor, including portable or fixed storage devices, optical storage devices, and various other mediums capable of storing, containing or carrying programming.

By way of example and not limitation, the storage medium 1104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1104 may be embodied in an article of manufacture (e.g., a computer program product). By way of example, a computer program product may include a computer-readable medium in packaging materials. In view of the above, in some implementations, the storage medium 1104 may be a non-transitory (e.g., tangible) storage medium.

The storage medium 1104 may be coupled to the processing circuit 1110 such that the processing circuit 1110 can read information from, and write information to, the storage medium 1104. That is, the storage medium 1104 can be coupled to the processing circuit 1110 so that the storage medium 1104 is at least accessible by the processing circuit 1110, including examples where at least one storage medium is integral to the processing circuit 1110 and/or examples where at least one storage medium is separate from the processing circuit 1110 (e.g., resident in the apparatus 1100, external to the apparatus 1100, distributed across multiple entities, etc.).

Programming stored by the storage medium 1104, when executed by the processing circuit 1110, causes the processing circuit 1110 to perform one or more of the various functions and/or process operations described herein. For example, the storage medium 1104 may include operations configured for regulating operations at one or more hardware blocks of the processing circuit 1110, as well as to utilize the communication interface 1102 for wireless communication utilizing their respective communication protocols. In some aspects, the storage medium 1104 may be a non-transitory computer-readable medium storing computer-executable code, including code to perform operations as described herein.

The processing circuit 1110 is generally adapted for processing, including the execution of such programming stored on the storage medium 1104. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1110 is arranged to obtain, process and/or send data, control data access and storage, issue commands, and control other desired operations. The processing circuit 1110 may include circuitry configured to implement desired programming provided by appropriate media in at least one example. For example, the processing circuit 1110 may be implemented as one or more processors, one or more controllers, and/or other structure configured to execute executable programming Examples of the processing circuit 1110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1110 are for illustration and other suitable configurations within the scope of the disclosure are also contemplated.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described with respect to FIGS. 1, 2, 5-10, and 12-14. As used herein, the term "adapted" in relation to the processing circuit 1110 may refer to the processing circuit 1110 being one or more of configured, used, implemented, and/or programmed to perform a particular process, function, operation and/or routine according to various features described herein.

The processing circuit 1110 may be a specialized processor, such as an application specific integrated circuit (ASIC) that serves as a means for (e.g., structure for) carrying out any one of the operations described in conjunction with FIGS. 1, 2, 5-10, and 12-14. The processing circuit 1110 may serve as one example of a means for transmitting and/or a means for receiving. In various implementations, the processing circuit 1510 may provide and/or incorporate, at least in part, the functionality described above for the first wireless communication device 202 (e.g., the encoder 212) of FIG. 2 or the encoder 1002 of FIG. 10.

According to at least one example of the apparatus 1100, the processing circuit 1110 may include one or more of a circuit/module for obtaining 1120, a circuit/module for mapping 1122, a circuit/module for encoding 1124, or a circuit/module for outputting 1126. In various implementations, the circuit/module for obtaining 1120, the circuit/module for mapping 1122, the circuit/module for encoding 1124, or the circuit/module for outputting 1126 may provide and/or incorporate, at least in part, the functionality described above for the first wireless communication device 202 (e.g., the encoder 212) of FIG. 2 or the encoder 1002 of FIG. 10.

As mentioned above, programming stored by the storage medium 1104, when executed by the processing circuit 1110, causes the processing circuit 1110 to perform one or more of the various functions and/or process operations described herein. For example, the programming may cause the processing circuit 1110 to perform the various functions, steps, and/or processes described herein with respect to FIGS. 1, 2, 5-10, and 12-14 in various implementations. As shown in FIG. 11, the storage medium 1104 may include one or more of code for obtaining 1130, code for mapping 1132, code for encoding 1134, or code for outputting 1136. In various implementations, the code for obtaining 1130, the code for mapping 1132, the code for encoding 1134, or the code for outputting 1136 may be executed or otherwise used to provide the functionality described herein for the circuit/module for obtaining 1120, the circuit/module for mapping 1122, the circuit/module for encoding 1124, or the circuit/module for outputting 1126.

The circuit/module for obtaining 1120 may include circuitry and/or programming (e.g., code for obtaining 1130 stored on the storage medium 1104) adapted to perform several functions relating to, for example, obtaining information. In some scenarios, the circuit/module for obtaining 1120 may receive information (e.g., from the communication interface 1102, the memory device 1108, or some other component of the apparatus 1100) and process (e.g., decode) the information. In some scenarios (e.g., if the circuit/module for obtaining 1120 is or includes an RF receiver), the circuit/module for obtaining 1120 may receive information directly from a device that transmitted the information. In either case, the circuit/module for obtaining 1120 may output the received information to another component of the apparatus 1100 (e.g., the circuit/module for mapping 1122, the circuit/module for encoding 1124, the memory device 1108, or some other component).

The circuit/module for obtaining 1120 (e.g., a means for obtaining) may take various forms. In some aspects, the circuit/module for obtaining 1120 may correspond to, for example, a processing circuit as discussed herein. In some aspects, the circuit/module for communicating 1122 may correspond to, for example, an interface (e.g., a bus interface, a receive interface, or some other type of signal interface), a communication device, a transceiver, a receiver, or some other similar component as discussed herein. In some implementations, the communication interface 1102 includes the circuit/module for obtaining 1120 and/or the code for obtaining 1130. In some implementations, the circuit/module for obtaining 1120 and/or the code for obtaining 1130 is configured to control the communication interface 1102 (e.g., a transceiver or a receiver) to communicate the information.

The circuit/module for mapping 1122 may include circuitry and/or programming (e.g., code for mapping 1132 stored on the storage medium 1104) adapted to perform several functions relating to, for example, mapping an information to a code sub-channel. In some aspects, the circuit/module for mapping 1122 (e.g., a means for mapping) may correspond to, for example, a processing circuit.

In some aspects, the circuit/module for mapping 1122 may obtain input information (e.g., from the means for obtaining 1120, the memory device 1108, or some other component) and, for each input, map the input to a corresponding sub-channel. For example, this mapping may be based on one or more criterion as discussed herein (e.g., in conjunction with FIGS. 8, 9, 12-14, and elsewhere). The circuit/module for mapping 1122 may then generate an output based on the mapping (e.g., an indication of the mapping) and provide the output to a component of the apparatus 1100 (e.g., the circuit/module for encoding 1124, the memory device 1108, or some other component).

The circuit/module for encoding 1124 may include circuitry and/or programming (e.g., code for encoding 1134 stored on the storage medium 1104) adapted to perform several functions relating to, for example, encoding information. In some aspects, the circuit/module for encoding 1124 (e.g., a means for encoding) may correspond to, for example, a processing circuit.

In some aspects, the circuit/module for encoding 1124 may execute an encoding algorithm on at least one input (e.g., obtained from the circuit/module for obtaining 1120, the circuit/module for mapping 1122, the memory device 1108, or some other component of the apparatus 1100). For example, the circuit/module for encoding 1124 may perform a block coding algorithm or a Polar coding algorithm. In some aspects, the circuit/module for encoding 1124 may perform one or more of the operations described above in conjunction with FIGS. 2, 5-10, and 12-14. The circuit/module for encoding 1124 then outputs the resulting encoded information (e.g., to the circuit/module for outputting 1126, the communication interface 1102, the memory device 1108, or some other component).

The circuit/module for outputting 1126 may include circuitry and/or programming (e.g., code for outputting 1136 stored on the storage medium 1104) adapted to perform several functions relating to, for example, outputting (e.g., sending or transmitting) information. In some implementations, the circuit/module for outputting 1126 may obtain information (e.g., from the circuit/module for encoding 1124, the memory device 1108, or some other component of the apparatus 1100) and process the information (e.g., encode the information for transmission). In some scenarios, the circuit/module for outputting 1126 sends the information to another component (e.g., the transmitter 1114, the communication interface 1102, or some other component) that will send the information to another device. In some scenarios (e.g., if the circuit/module for outputting 1126 includes a transmitter), the circuit/module for outputting 1126 transmits the information directly to another device (e.g., the ultimate destination) via radio frequency signaling or some other type of signaling suitable for the applicable communication medium.

The circuit/module for outputting 1126 (e.g., a means for outputting) may take various forms. In some aspects, the circuit/module for outputting 1126 may correspond to, for example, a processing circuit as discussed herein. In some aspects, the circuit/module for outputting 1126 may correspond to, for example, an interface (e.g., a bus interface, a send interface, or some other type of signal interface), a communication device, a transceiver, a transmitter, or some other similar component as discussed herein. In some implementations, the communication interface 1102 includes the circuit/module for outputting 1126 and/or the code for outputting 1136. In some implementations, the circuit/module for outputting 1126 and/or the code for outputting 1136 is configured to control the communication interface 1102 (e.g., a transceiver or a transmitter) to transmit information.

First Example Process

Figure 12:
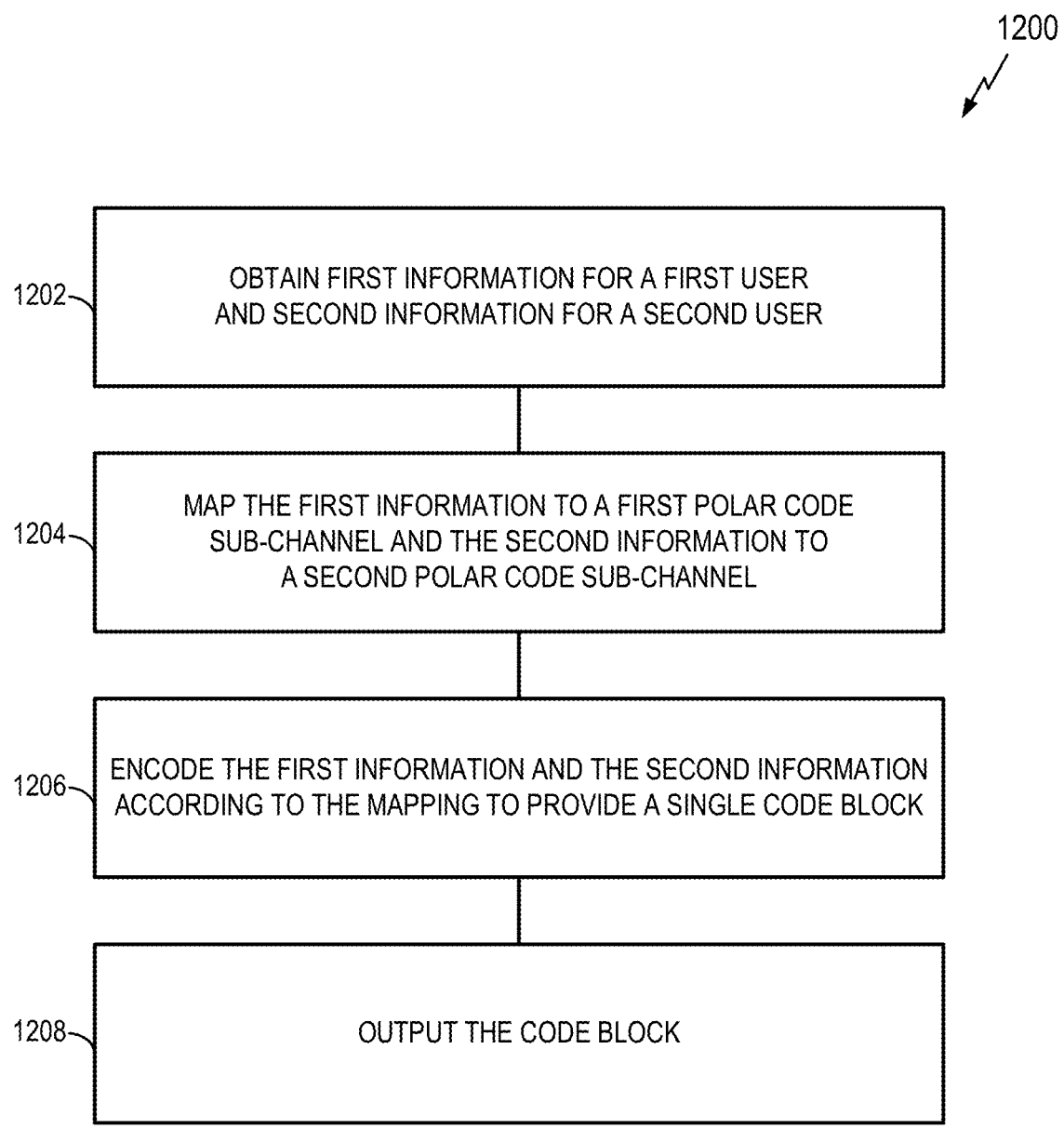
FIG. 12 is a flowchart illustrating an example of an encoding process in accordance with some aspects of the disclosure.

FIG. 12 illustrates a process 1200 for communication in accordance with some aspects of the disclosure. One or more aspects of the process 1200 may be used in conjunction with (e.g., in addition to or as part of) the process 1300 of FIG. 13 or the process 1400 of FIG. 14. The process 1200 may take place within a processing circuit (e.g., the processing circuit 1110 of FIG. 11), which may be located in an access terminal, a base station, or some other suitable apparatus (e.g., that provides encoding). Of course, in various aspects within the scope of the disclosure, the process 1200 may be implemented by any suitable apparatus capable of supporting signaling-related operations.

At block 1202, an apparatus (e.g., a device that include an encoder) obtains first information for a first user and second information for a second user. For example, a processing circuit of the apparatus may receive a digital signal including the information from a receive interface, a transceiver, or some other component. As another example, an interface may receive a signal including the information from a transceiver. As yet another example, a receiver may receive an RF signal including the information. In some aspects, the first information and the second information may each include (e.g., may be) control information.

In some implementations, the circuit/module for obtaining 1120 of FIG. 11 performs the operations of block 1202. In some implementations, the code for obtaining 1130 of FIG. 11 is executed to perform the operations of block 1202.

At block 1204, the apparatus maps the first information to a first Polar code sub-channel and the second information to a second Polar code sub-channel. The mapping may include other inputs and sub-channels in a typical case. For example, the mapping may further include mapping at least one other control information for at least one other user to at least one other Polar code sub-channel.

The mapping may take different forms in different implementations. In some aspects, the mapping may include determining whether the first Polar code sub-channel is associated with a higher error probability than the second Polar code sub-channel; and assigning the first information to the first Polar code sub-channel and the second information to the second Polar code sub-channel based on the determination. In some aspects, the mapping may include determining whether the first user is associated with a higher wireless communication channel quality than the second user; and assigning the first information to the first Polar code sub-channel and the second information to the second Polar code sub-channel based on the determination. In some aspects, the mapping may include determining that the first user is associated with a lower wireless communication channel quality than the second user and that the first Polar code sub-channel is associated with a higher error probability than the second Polar code sub-channel; and assigning the first information to the first Polar code sub-channel and the second information to the second Polar code sub-channel based on the determination. In some aspects, the mapping may include determining whether the first information has a higher priority than the second information; and assigning the first information to the first Polar code sub-channel and the second information to the second Polar code sub-channel based on the determination. In some aspects, the mapping may include determining that the first information has a higher priority than the second information and that the first Polar code sub-channel is associated with a lower error probability than the second Polar code sub-channel; and assigning the first information to the first Polar code sub-channel and the second information to the second Polar code sub-channel based on the determination.

In some implementations, the circuit/module for mapping 1122 of FIG. 11 performs the operations of block 1204. In some implementations, the code for mapping 1132 of FIG. 11 is executed to perform the operations of block 1204.

At block 1206, the apparatus encodes the first information and the second information according to the mapping to provide a single code block. In some aspects, the encoding may include (e.g., may be) Polar coding.

The encoding may take different forms in different implementations. In some aspects, the encoding may include encoding first error correction information for the first information; and encoding second error correction information for the second information, where the second error correction information is different from the first error correction information. In some aspects, the encoding may include generating a first cyclic redundancy check (CRC) value for the first information; and generating a second cyclic redundancy check (CRC) value for the second information independently of the generation of the first CRC value for the first information. In some aspects, the first CRC value may have a first length; and the second CRC value may have a second length that is equal to the first length.

In some implementations, the circuit/module for encoding 1124 of FIG. 11 performs the operations of block 1206. In some implementations, the code for encoding 1134 of FIG. 11 is executed to perform the operations of block 1206.

At block 1208, the apparatus outputs the code block. For example, a processing circuit of the apparatus may send a digital signal including the code block to an interface, a transceiver, or some other component. As another example, an interface may send a signal including the code block to a transceiver. As yet another example, a transmitter may transmit an RF signal including the code block.

In some implementations, the circuit/module for outputting 1126 of FIG. 11 performs the operations of block 1208. In some implementations, the code for outputting 1136 of FIG. 11 is executed to perform the operations of block 1208.

In some aspects, a process may include any combination of the aspects described above for FIG. 12.

Second Example Process

Figure 13:
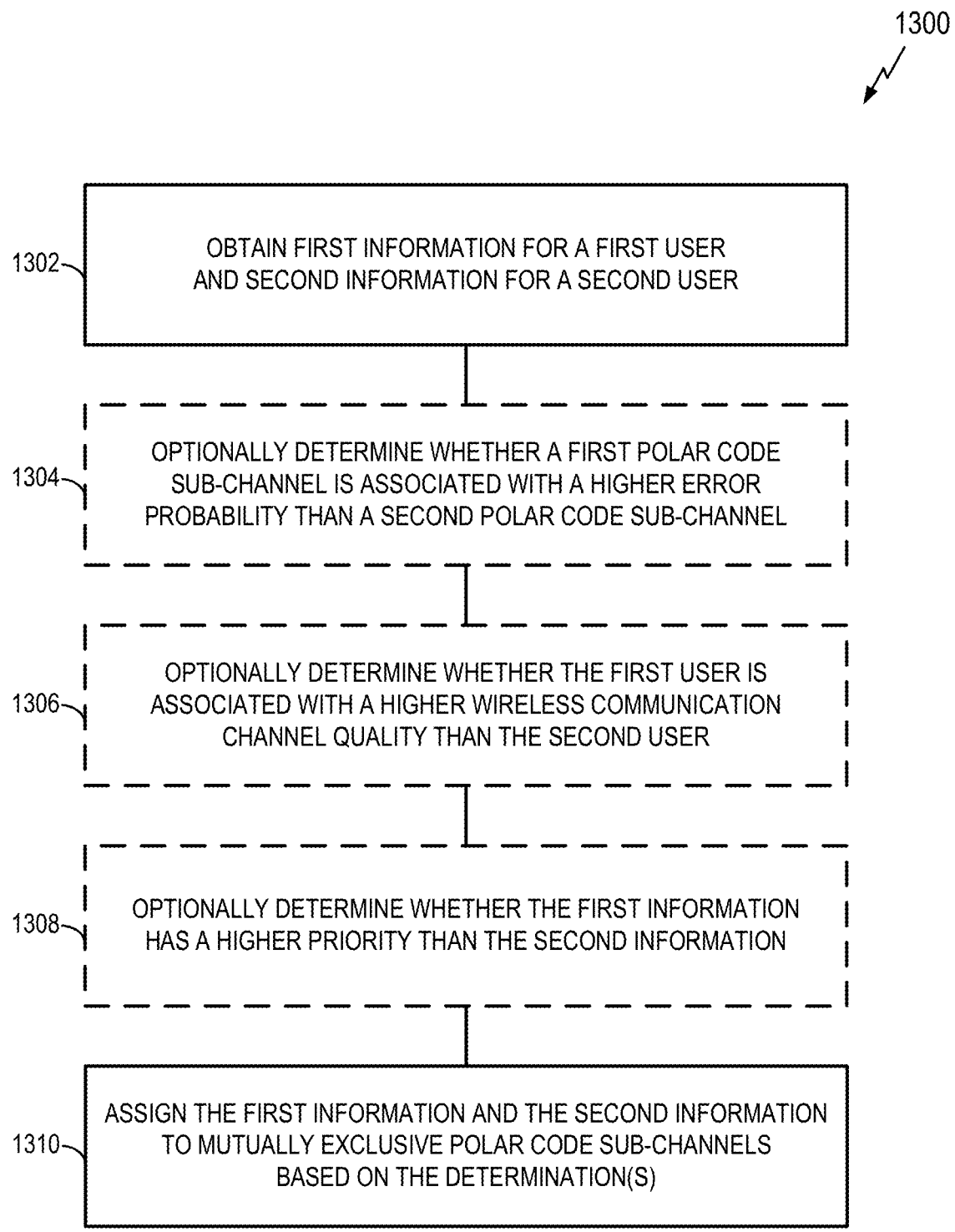
FIG. 13 is a flowchart illustrating an example of a mapping process in accordance with some aspects of the disclosure.

FIG. 13 illustrates a process 1300 for communication in accordance with some aspects of the disclosure. One or more aspects of the process 1300 may be used in conjunction with (e.g., in addition to or as part of) the process 1200 of FIG. 12 or the process 1400 of FIG. 14. The process 1300 may take place within a processing circuit (e.g., the processing circuit 1110 of FIG. 11), which may be located in an access terminal, a base station, or some other suitable apparatus (e.g., that provides encoding). Of course, in various aspects within the scope of the disclosure, the process 1300 may be implemented by any suitable apparatus capable of supporting signaling-related operations.

At block 1302, an apparatus (e.g., a device that include an encoder) obtains first information for a first user and second information for a second user. In some aspects, the operations of block 1302 may be similar to the operations of block 1202 of FIG. 12.

In some implementations, the circuit/module for obtaining 1120 of FIG. 11 performs the operations of block 1302. In some implementations, the code for obtaining 1130 of FIG. 11 is executed to perform the operations of block 1302.

At optional block 1304, the apparatus may determines whether a first Polar code sub-channel is associated with a higher error probability than a second Polar code sub-channel. For example, the operations of block 1304 may involve comparing a first error probability associated with the first Polar code sub-channel to a second error probability associated with the second Polar code sub-channel.

In some implementations, the circuit/module for mapping 1122 of FIG. 11 performs the operations of block 1304. In some implementations, the code for mapping 1132 of FIG. 11 is executed to perform the operations of block 1304.

At optional block 1306, the apparatus may determine whether the first user is associated with a higher wireless communication channel quality than a second user. For example, the operations of block 1306 may involve comparing a first wireless communication channel quality associated with the first user to a second wireless communication channel quality associated with the second user.

In some implementations, the circuit/module for mapping 1122 of FIG. 11 performs the operations of block 1306. In some implementations, the code for mapping 1132 of FIG. 11 is executed to perform the operations of block 1306.

At optional block 1308, the apparatus may determine whether the first information has a higher priority than the second information. For example, the operations of block 1304 may involve comparing a first priority associated with the first information to a second priority associated with the second information.

In some implementations, the circuit/module for mapping 1122 of FIG. 11 performs the operations of block 1308. In some implementations, the code for mapping 1132 of FIG. 11 is executed to perform the operations of block 1308.

At block 1310, the apparatus assigns the first information and the second information to mutually exclusive Polar code sub-channels. For example, and without limitation, the operations of block 1310 may involve assigning the first information to a second Polar code subchannel and assigning the second information to a first Polar code sub-channel. This assignment may be based on one or more of the determination of block 1304, the determination of block 1306, or the determination of block 1308.

In some implementations, the circuit/module for mapping 1122 of FIG. 11 performs the operations of block 1310. In some implementations, the code for mapping 1132 of FIG. 11 is executed to perform the operations of block 1310.

In some aspects, a process may include any combination of the aspects described above for FIG. 13.

Third Example Process

Figure 14:
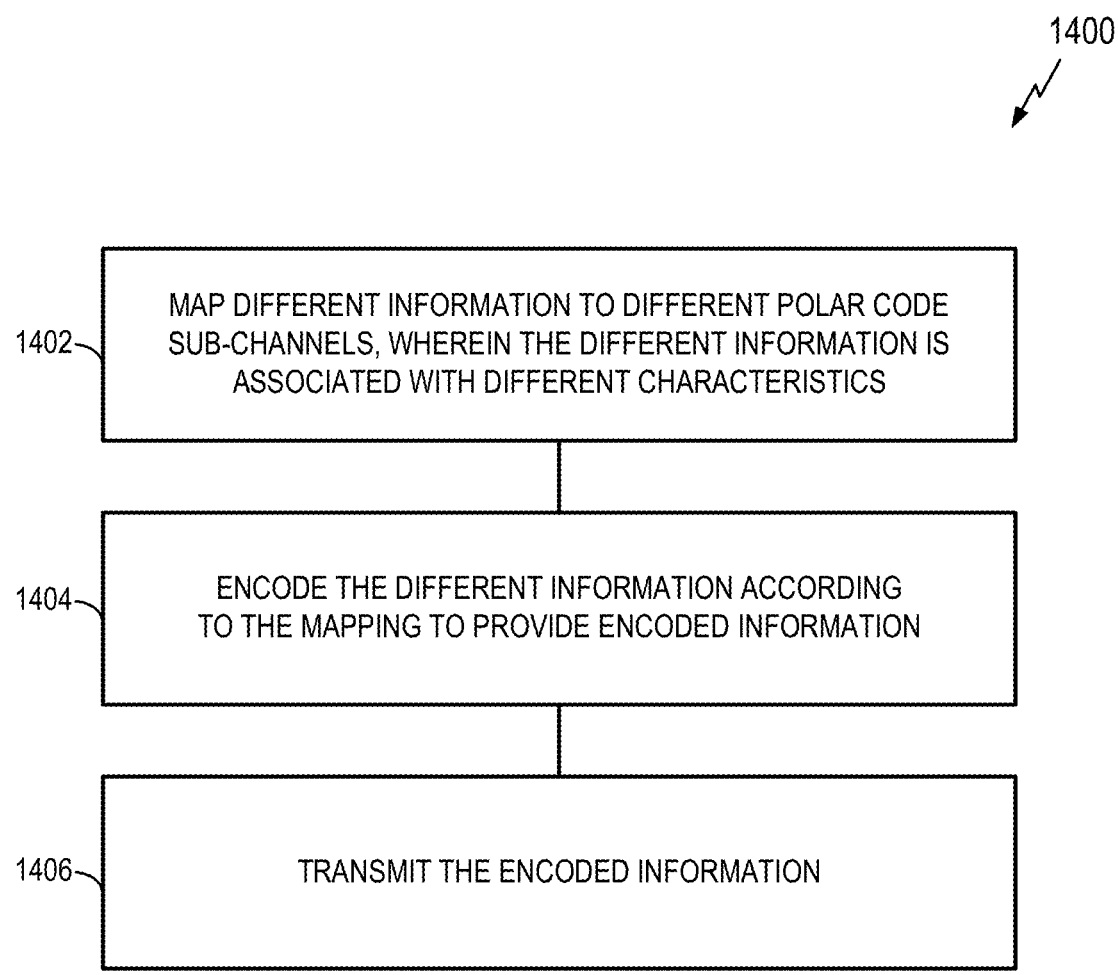
FIG. 14 is a flowchart illustrating another example of an encoding process in accordance with some aspects of the disclosure.

FIG. 14 illustrates a process 1400 for communication in accordance with some aspects of the disclosure. One or more aspects of the process 1400 may be used in conjunction with (e.g., in addition to or as part of) the process 1200 of FIG. 12 or the process 1300 of FIG. 13. The process 1400 may take place within a processing circuit (e.g., the processing circuit 1110 of FIG. 11), which may be located in an access terminal, a base station, or some other suitable apparatus (e.g., that provides encoding). Of course, in various aspects within the scope of the disclosure, the process 1400 may be implemented by any suitable apparatus capable of supporting signaling-related operations.

At block 1402, an apparatus (e.g., a device that include an encoder) maps different information to different Polar code sub-channels. The information may take different forms in different implementations. In some aspects, the different information may be associated with different characteristics. In some aspects, the different information may be different types of information. In some aspects, the different information includes control information.

In some aspects, the different characteristics may include different users experiencing different wireless communication channel qualities. For example, users experiencing lower wireless communication channel quality may be mapped to Polar code sub-channels having higher quality.

In some aspects, the characteristics may be priorities. For example, information with higher priority may be mapped to Polar code sub-channels having higher quality.

In some implementations, the circuit/module for mapping 1122 of FIG. 11 performs the operations of block 1402. In some implementations, the code for mapping 1132 of FIG. 11 is executed to perform the operations of block 1402.

At block 1404, the apparatus encodes the different information according to the mapping to provide encoded information. In some aspects, the encoding includes Polar coding. In some aspects, the encoding includes encoding the different information in a single code block.

In some aspects, the process 1400 may further include encoding error correction information for each type of information. For example, the process 1400 may include separately encoding CRC information for the information for each user. In some aspects, the CRC information for each user may have the same length.

In some implementations, the circuit/module for encoding 1124 of FIG. 11 performs the operations of block 1404. In some implementations, the code for encoding 1134 of FIG. 11 is executed to perform the operations of block 1404.

At block 1406, the apparatus transmits the encoded information. In some aspects, the operations of block 1406 may be similar to the operations of block 1208 of FIG. 12.

In some implementations, the circuit/module for outputting 1126 of FIG. 11 performs the operations of block 1406. In some implementations, the code for outputting 1136 of FIG. 11 is executed to perform the operations of block 1404.

In some aspects, a process may include any combination of the aspects described above for FIG. 14.

Second Example Apparatus

Figure 15:
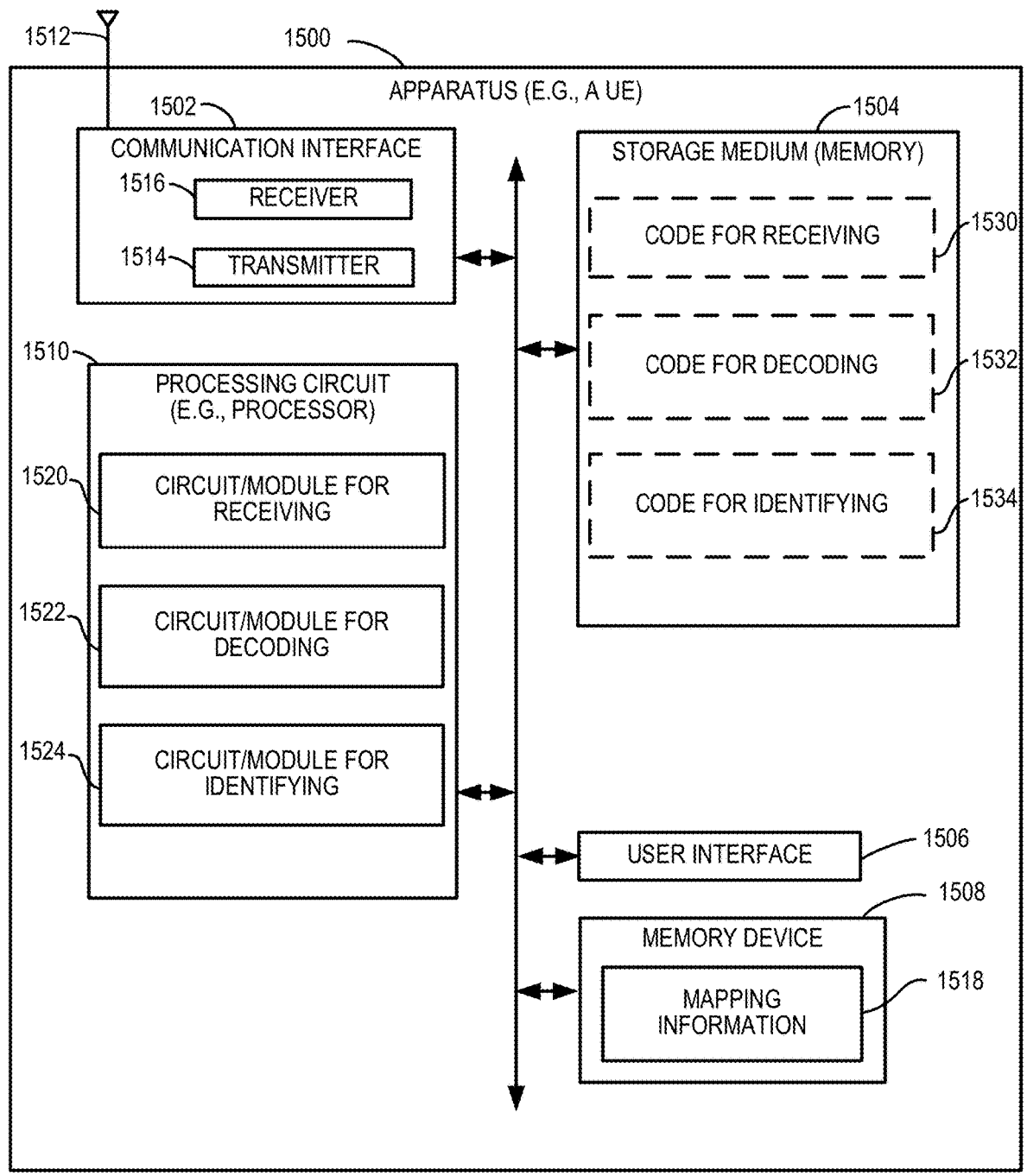
FIG. 15 is a block diagram illustrating an example hardware implementation for an apparatus (e.g., an electronic device) that provides decoding in accordance with some aspects of the disclosure.

FIG. 15 is an illustration of an apparatus 1500 that may use decoding according to one or more aspects of the disclosure. The apparatus 1500 could embody or be implemented within a UE, an access point, a TRP, a gNB, or some other type of device that supports decoding. In various implementations, the apparatus 1500 could embody or be implemented within an access terminal, an access point, or some other type of device. In various implementations, the apparatus 1500 could embody or be implemented within a mobile phone, a smart phone, a tablet, a portable computer, a server, a personal computer, a sensor, an alarm, a vehicle, a machine, an entertainment device, a medical device, or any other electronic device having circuitry.

The apparatus 1500 includes a communication interface (e.g., at least one transceiver) 1502, a storage medium 1504, a user interface 1506, a memory device 1508 (e.g., storing mapping information 1518), and a processing circuit (e.g., at least one processor) 1510. In various implementations, the user interface 1506 may include one or more of: a keypad, a display, a speaker, a microphone, a touchscreen display, of some other circuitry for receiving an input from or sending an output to a user. The communication interface 1502 may be coupled to one or more antennas 1512, and may include a transmitter 1514 and a receiver 1516. In general, the components of FIG. 15 may be similar to corresponding components of the apparatus 1100 of FIG. 11.

According to one or more aspects of the disclosure, the processing circuit 1510 may be adapted to perform any or all of the features, processes, functions, operations and/or routines for any or all of the apparatuses described herein. For example, the processing circuit 1510 may be configured to perform any of the steps, functions, and/or processes described with respect to FIGS. 1, 2, 5-10 and 16. As used herein, the term "adapted" in relation to the processing circuit 1510 may refer to the processing circuit 1510 being one or more of configured, used, implemented, and/or programmed to perform a particular process, function, operation and/or routine according to various features described herein.

The processing circuit 1510 may be a specialized processor, such as an application-specific integrated circuit (ASIC) that serves as a means for (e.g., structure for) carrying out any one of the operations described in conjunction with FIGS. 1, 2, 5-10 and 16. The processing circuit 1510 serves as one example of a means for transmitting and/or a means for receiving. In various implementations, the processing circuit 1510 may provide and/or incorporate, at least in part, the functionality described above for the second wireless communication device 204 (e.g., the decoder 214) of FIG. 2 or the decoder 1004 of FIG. 10.

According to at least one example of the apparatus 1500, the processing circuit 1510 may include one or more of a circuit/module for receiving 1520, a circuit/module for decoding 1522, or a circuit/module for identifying 1524. In various implementations, the circuit/module for receiving 1520, the circuit/module for decoding 1522, or the circuit/module for identifying 1524 may provide and/or incorporate, at least in part, the functionality described above for the second wireless communication device 204 (e.g., the decoder 214) of FIG. 2 or the decoder 1004 of FIG. 10.

As mentioned above, programming stored by the storage medium 1504, when executed by the processing circuit 1510, causes the processing circuit 1510 to perform one or more of the various functions and/or process operations described herein. For example, the programming may cause the processing circuit 1510 to perform the various functions, steps, and/or processes described herein with respect to FIGS. 1, 2, 5-10 and 16 in various implementations. As shown in FIG. 15, the storage medium 1504 may include one or more of code for receiving 1530, code for decoding 1532, or code for identifying 1534. In various implementations, the code for receiving 1530, the code for decoding 1532, or the code for identifying 1534 may be executed or otherwise used to provide the functionality described herein for the circuit/module for receiving 1520, the circuit/module for decoding 1522, or the circuit/module for identifying 1524.

The circuit/module for receiving 1520 may include circuitry and/or programming (e.g., code for receiving 1530 stored on the storage medium 1504) adapted to perform several functions relating to, for example, receiving information. In some scenarios, the circuit/module for receiving 1520 may obtain information (e.g., from the communication interface 1502, the memory device, or some other component of the apparatus 1500) and processes (e.g., decodes) the information. In some scenarios (e.g., if the circuit/module for receiving 1520 is or includes an RF receiver), the circuit/module for receiving 1520 may receive information directly from a device that transmitted the information. In either case, the circuit/module for receiving 1520 may output the obtained information to another component of the apparatus 1500 (e.g., the circuit/module for determining a code block size 1522, the circuit/module for block encoding 1526, the memory device 1508, or some other component).

The circuit/module for receiving 1520 (e.g., a means for receiving) may take various forms. In some aspects, the circuit/module for receiving 1520 may correspond to, for example, an interface (e.g., a bus interface, a send/receive interface, or some other type of signal interface), a communication device, a transceiver, a receiver, or some other similar component as discussed herein. In some implementations, the communication interface 1502 includes the circuit/module for receiving 1520 and/or the code for receiving 1530. In some implementations, the circuit/module for receiving 1520 and/or the code for receiving 1530 is configured to control the communication interface 1502 (e.g., a transceiver or a receiver) to receive information.

The circuit/module for decoding 1522 may include circuitry and/or programming (e.g., code for decoding 1532 stored on the storage medium 1504) adapted to perform several functions relating to, for example, decoding information. In some aspects, the circuit/module for decoding 1522 (e.g., a means for decoding) may correspond to, for example, a processing circuit.

In some aspects, the circuit/module for decoding 1522 may execute an decoding algorithm on at least one encoded input (e.g., obtained from the circuit/module for receiving 1520, the memory device 1508, or some other component of the apparatus 1500). For example, the circuit/module for decoding 1522 may perform an SC decoding algorithm. In some aspects, the circuit/module for decoding 1522 may perform one or more of the operations described above in conjunction with FIGS. 2, 5-10, and 16. The circuit/module for decoding 1522 then outputs the resulting decoded information (e.g., to the circuit/module for identifying 1524, the communication interface 1502, the memory device 1508, or some other component).

The circuit/module for identifying 1524 may include circuitry and/or programming (e.g., code for identifying 1534 stored on the storage medium 1504) adapted to perform several functions relating to, for example identifying information within a decoded block of information. In some aspects, the circuit/module for identifying 1524 (e.g., a means for identifying) may correspond to, for example, a processing circuit.

Initially, the circuit/module for identifying 1524 may obtain a decoded block (e.g., from the circuit/module for decoding 1522, the memory device 1508, or some other component). Next, the circuit/module for identifying 1524 locates specified information (e.g., information associated with a particular user as indicates, for example, by an identifier) in the decoded block. In some aspects, the circuit/ module for identifying 1524 may perform one or more of the operations described above in conjunction with FIGS. 2, 5-10, and 16. The circuit/module for identifying 1524 may then output the identified information (e.g., to the memory device 1508 or some other component).

Fourth Example Process

Figure 16:
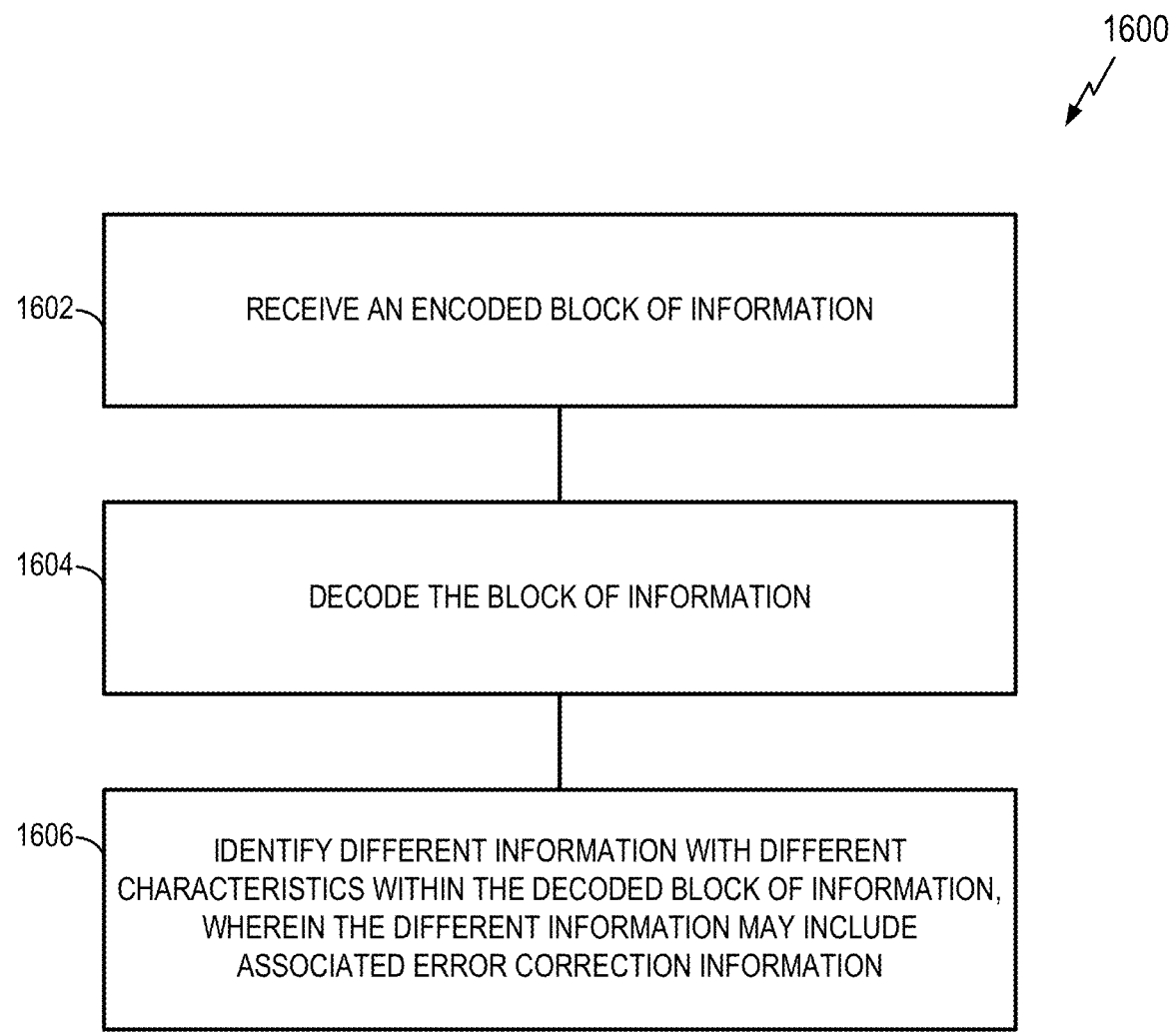
FIG. 16 is a flowchart illustrating an example of a mapping process in accordance with some aspects of the disclosure.

FIG. 16 illustrates a process 1600 for communication in accordance with some aspects of the disclosure. The process 1600 may take place within a processing circuit (e.g., the processing circuit 1510 of FIG. 15), which may be located in an access terminal, a base station, or some other suitable apparatus (e.g., that provides decoding). Of course, in various aspects within the scope of the disclosure, the process 1600 may be implemented by any suitable apparatus capable of supporting signaling-related operations.

At block 1602, an apparatus (e.g., a device that include a decoder) receives an encoded block of information. For example, a processing circuit of the apparatus may receive a digital signal including the encoded block of information from a receive interface, a transceiver, or some other component. As another example, an interface may receive a signal including the encoded block of information from a transceiver. As yet another example, a receiver may receive an RF signal including the encoded block of information.

In some implementations, the circuit/module for receiving 1520 of FIG. 15 performs the operations of block 1602. In some implementations, the code for receiving 1530 of FIG. 15 is executed to perform the operations of block 1602.

At block 1604, the apparatus decodes the block of information. In some aspects, the encoded block of information may include Polar coded information.

In some implementations, the circuit/module for decoding 1522 of FIG. 15 performs the operations of block 1604. In some implementations, the code for decoding 1532 of FIG. 15 is executed to perform the operations of block 1604.

At block 1606, the apparatus identifies different information associated with different characteristics within the decoded block of information. In some aspects, the different information may include associated error correction information. In some aspects, the error correction information may include CRC information. In some aspects, the different types of information may be for different users and the CRC information for each user may have the same length. In some aspects, the different information may be different types of information.

The characteristics may take different forms in different implementations. In some aspects, the different characteristics may include different users experiencing different wireless communication channel qualities. In some aspects, the characteristics may be priorities.

In some implementations, the circuit/module for identifying 1524 of FIG. 15 performs the operations of block 1606. In some implementations, the code for identifying 1534 of FIG. 15 is executed to perform the operations of block 1606.

In some aspects, a process may include any combination of the aspects described above for FIG. 16.

Additional Aspects

In one aspect, the disclosure provides an apparatus configured for communication that includes a memory and a processor coupled to the memory. The processor and the memory are configured to: map different information to different Polar code sub-channels, wherein the different information is associated with different characteristics;

encode the different information according to the mapping to provide encoded information; and transmit the encoded information.

Another aspect of the disclosure provides a method for communication including: mapping different information to different Polar code sub-channels, wherein the different information is associated with different characteristics; encoding the different information according to the mapping to provide encoded information; and transmitting the encoded information.

Another aspect of the disclosure provides an apparatus configured for communication. The apparatus including: means for mapping different information to different Polar code sub-channels, wherein the different information is associated with different characteristics; means for encoding the different information according to the mapping to provide encoded information; and means for transmitting the encoded information.

Another aspect of the disclosure provides a non-transitory computer-readable medium storing computer-executable code, including code to: map different information to different Polar code sub-channels, wherein the different information is associated with different characteristics; encode the different information according to the mapping to provide encoded information; and transmit the encoded information.

In one aspect, the disclosure provides an apparatus configured for communication that includes a memory and a processor coupled to the memory. The processor and the memory are configured to: receive an encoded block of information; decode the block of information; and identify different information associated with different characteristics within the decoded block of information, wherein the different information includes associated error correction information.

Another aspect of the disclosure provides a method for communication including: receiving an encoded block of information; decoding the block of information; and identifying different information associated with different characteristics within the decoded block of information, wherein the different information includes associated error correction information.

Another aspect of the disclosure provides an apparatus configured for communication. The apparatus including: means for receiving an encoded block of information; means for decoding the block of information; and means for identifying different information associated with different characteristics within the decoded block of information, wherein the different information includes associated error correction information.

Another aspect of the disclosure provides a non-transitory computer-readable medium storing computer-executable code, including code to: receive an encoded block of information; decode the block of information; and identify different information associated with different characteristics within the decoded block of information, wherein the different information includes associated error correction information.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards. Various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication, comprising:
obtaining first information and second information;
determining that a first priority associated with the first information is higher than a second priority associated with the second information;
determining that the first information is associated with a first wireless communication channel with a first channel quality;
determining that the second information is associated with a second wireless communication channel with a second channel quality that is lower than the first channel quality;
determining that a first Polar code sub-channel is associated with a higher error probability than a second Polar code sub-channel;
mapping the first information to the first Polar code sub-channel and the second information to the second Polar code sub-channel based on the determining that the first priority associated with the first information is higher than the second priority associated with the second information, and based on the determining that the first information is associated with the first wireless communication channel with the first channel quality, and based on the determining that the second information is associated with the second wireless communication channel with the second channel quality that is lower than the first channel quality, and based on the determining that the first Polar code sub-channel is associated with the higher error probability than the second Polar code sub-channel;

encoding the first information and the second information according to the mapping to provide a single code block; and transmitting the code block via the first wireless communication channel and the second wireless communication channel.

2. The method of claim 1, wherein:
the first information comprises first control information for a first user and the second information comprises second control information for a second user; and
encoding the first information and the second information according to the mapping to provide the single code block comprises encoding the first control information for the first user and the second control information for the second user in the single code block.

3. The method of claim 1, wherein the encoding comprises:
encoding first error correction information for the first information; and
encoding second error correction information for the second information,
wherein the second error correction information is different from the first error correction information.

4. The method of claim 1, wherein the encoding comprises:
generating a first cyclic redundancy check (CRC) value for the first information; and
generating a second cyclic redundancy check (CRC) value for the second information independently of the generation of the first CRC value for the first information.

5. The method of claim 4, wherein:
the first CRC value has a first length; and
the second CRC value has a second length that is equal to the first length.

6. The method of claim 1, further comprising:
mapping at least one other control information for at least one user to at least one other Polar code sub-channel.

7. The method of claim 1, wherein the encoding comprises Polar coding.

8. An apparatus for communication comprising:
a memory; and
a processor coupled to the memory,
the processor and the memory configured to:
obtain first information and second information;
determine that a first priority associated with the first information is higher than a second priority associated with the second information;
determine that the first information is associated with a first wireless communication channel with a first channel quality;
determine that the second information is associated with a second wireless communication channel with a second channel quality that is lower than the first channel quality;

determine that a first Polar code sub-channel is associated with a higher error probability than a second Polar code sub-channel;

map the first information to the first Polar code sub-channel and the second information to the second Polar code sub-channel based on the determination that the first priority associated with the first information is higher than the second priority associated with the second information, and based on the determination that the first information is associated with the first wireless communication channel with the first channel quality, and based on the determination that the second information is associated with the second wireless communication channel with the second channel quality that is lower than the first channel quality, and based on the determination that the first Polar code sub-channel is associated with the higher error probability than the second Polar code sub-channel;

encode the first information and the second information according to the mapping to provide a single code block; and output the code block for transmission via the first wireless communication channel and the second wireless communication channel.

9. The apparatus of claim 8, wherein the first information and the second information each comprise control information.

10. The apparatus of claim 8, wherein the processor and the memory are further configured to:
encode first error correction information for the first information; and
encode second error correction information for the second information,
wherein the second error correction information is different from the first error correction information.

11. The apparatus of claim 8, wherein the processor and the memory are further configured to:
generate a first cyclic redundancy check (CRC) value for the first information; and
generate a second cyclic redundancy check (CRC) value for the second information independently of the generation of the first CRC value for the first information.

12. The apparatus of claim 11, wherein:
the first CRC value has a first length; and
the second CRC value has a second length that is equal to the first length.

13. The apparatus of claim 8, wherein the processor and the memory are further configured to:
map at least one other control information for at least one other user to at least one other Polar code sub-channel.

14. The apparatus of claim 8, wherein the processor and the memory are further configured to Polar encode the first information and the second information.

15. An apparatus for communication comprising:
means for obtaining first information for a first user and second information for a second user;
means for determining that a first priority associated with the first information is higher than a second priority associated with the second information;
means for determining that the first information is associated with a first wireless communication channel with a first channel quality;
means for determining that the second information is associated with a second wireless communication channel with a second channel quality that is lower than the first channel quality;

means for determining that a first Polar code sub-channel is associated with a higher error probability than a second Polar code sub-channel;

means for mapping the first information to the first Polar code sub-channel and the second information to the second Polar code sub-channel based on the determining that the first priority associated with the first information is higher than the second priority associated with the second information, and based on the determining that the first information is associated with the first wireless communication channel with the first channel quality, and based on the determining that the second information is associated with the second wireless communication channel with the second channel quality that is lower than the first channel quality, and based on the determining that the first Polar code sub-channel is associated with the higher error probability than the second Polar code sub-channel;

means for encoding the first information and the second information according to the mapping to provide a single code block; and means for transmitting the code block via the first wireless communication channel and the second wireless communication channel.

16. The apparatus of claim 15, wherein the first information and the second information each comprise control information.

17. The apparatus of claim 15, wherein the encoding comprises:

generating a first cyclic redundancy check (CRC) value for the first information; and generating a second cyclic redundancy check (CRC) value for the second information independently of the generation of the first CRC value for the first information.

18. A non-transitory computer-readable medium storing computer-executable code, including code to:

obtain first information and second information;

determine that a first priority associated with the first information is higher than a second priority associated with the second information;

determine that the first information is associated with a first wireless communication channel with a first channel quality;

determine that the second information is associated with a second wireless communication channel with a second channel quality that is lower than the first channel quality;

determine that a first Polar code sub-channel is associated with a higher error probability than a second Polar code sub-channel;

map the first information to the first Polar code sub-channel and the second information to the second Polar code sub-channel based on the determination that the first priority associated with the first information is higher than the second priority associated with the second information, and based on the determination that the first information is associated with the first wireless communication channel with the first channel quality, and based on the determination that the second information is associated with the second wireless communication channel with the second channel quality that is lower than the first channel quality, and based on the determination that the first Polar code sub-channel is associated with the higher error probability than the second Polar code sub-channel;

encode the first information and the second information according to the mapping to provide a single code block; and output the code block for transmission via the first wireless communication channel and the second wireless communication channel.

* * * * *